(12) United States Patent
Bellegarda

(10) Patent No.: US 9,053,089 B2
(45) Date of Patent: Jun. 9, 2015

(54) PART-OF-SPEECH TAGGING USING LATENT ANALOGY

(75) Inventor: Jerome Bellegarda, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1337 days.

(21) Appl. No.: 11/906,592

(22) Filed: Oct. 2, 2007

(65) Prior Publication Data

US 2009/0089058 A1   Apr. 2, 2009

(51) Int. Cl.
| | |
|---|---|
| *G06F 17/20* | (2006.01) |
| *G06F 17/28* | (2006.01) |
| *G06F 17/27* | (2006.01) |
| *G10L 15/18* | (2013.01) |
| *G10L 13/08* | (2013.01) |

(52) U.S. Cl.
CPC .......... *G06F 17/277* (2013.01); *G06F 17/2785* (2013.01); *G10L 13/08* (2013.01)

(58) Field of Classification Search
CPC ....... G06G 17/20; G06G 17/21; G06G 17/27; G06G 17/2755; G06G 17/2765; G06G 17/277; G06G 17/2775
USPC .............................................. 704/1, 4, 9, 257
See application file for complete search history.

(56) References Cited

U.S. PATENT DOCUMENTS

| | | | |
|---|---|---|---|
| 3,704,345 | A | 11/1972 | Coker et al. |
| 3,828,132 | A | 8/1974 | Flanagan et al. |
| 3,979,557 | A | 9/1976 | Schulman et al. |
| 4,278,838 | A | 7/1981 | Antonov |
| 4,282,405 | A | 8/1981 | Taguchi |
| 4,310,721 | A | 1/1982 | Manley et al. |
| 4,348,553 | A | 9/1982 | Baker et al. |
| 4,653,021 | A | 3/1987 | Takagi |
| 4,688,195 | A | 8/1987 | Thompson et al. |
| 4,692,941 | A | 9/1987 | Jacks et al. |
| 4,718,094 | A | 1/1988 | Bahl et al. |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Hinrich Schutze. Part-of-speech induction from scratch. In 31st Annual Meeting of the Association for Computational Linguistics, pp. 251-258, 1993.*

(Continued)

*Primary Examiner* — Paras D Shah
(74) *Attorney, Agent, or Firm* — Morrison & Foerster LLP

(57) ABSTRACT

Methods and apparatuses to assign part-of-speech tags to words are described. An input sequence of words is received. A global fabric of a corpus having training sequences of words may be analyzed in a vector space. A global semantic information associated with the input sequence of words may be extracted based on the analyzing. A part-of-speech tag may be assigned to a word of the input sequence based on POS tags from pertinent words in relevant training sequences identified using the global semantic information. The input sequence may be mapped into a vector space. A neighborhood associated with the input sequence may be formed in the vector space wherein the neighborhood represents one or more training sequences that are globally relevant to the input sequence.

26 Claims, 12 Drawing Sheets

(56) References Cited

U.S. PATENT DOCUMENTS

| | | |
|---|---|---|
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,610,812 A * | 3/1997 | Schabes et al. .......... 704/9 |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |

(56) References Cited

U.S. PATENT DOCUMENTS

| | | |
|---|---|---|
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |

(56) References Cited

U.S. PATENT DOCUMENTS

| | | | |
|---|---|---|---|
| 6,847,979 B2 | 1/2005 | Allemang et al. | |
| 6,851,115 B1 | 2/2005 | Cheyer et al. | |
| 6,859,931 B1 | 2/2005 | Cheyer et al. | |
| 6,873,986 B2 | 3/2005 | McConnell et al. | |
| 6,877,003 B2 | 4/2005 | Ho et al. | |
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,910,004 B2 * | 6/2005 | Tarbouriech et al. | 704/9 |
| 6,912,499 B1 | 6/2005 | Sabourin et al. | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,925 B2 | 2/2006 | Fischer et al. | |
| 6,999,927 B2 | 2/2006 | Mozer et al. | |
| 7,020,685 B1 | 3/2006 | Chen et al. | |
| 7,027,974 B1 | 4/2006 | Busch et al. | |
| 7,036,128 B1 | 4/2006 | Julia et al. | |
| 7,043,422 B2 | 5/2006 | Gao et al. | |
| 7,047,193 B1 * | 5/2006 | Bellegarda | 704/254 |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,152,070 B1 | 12/2006 | Musick et al. | |
| 7,177,798 B2 | 2/2007 | Hsu et al. | |
| 7,177,817 B1 | 2/2007 | Khosla et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,266,496 B2 | 9/2007 | Wang et al. | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,925,610 B2 * | 4/2011 | Elbaz et al. | 706/55 |
| 7,930,168 B2 | 4/2011 | Weng et al. | |
| 7,949,529 B2 | 5/2011 | Weider et al. | |
| 7,949,534 B2 | 5/2011 | Davis et al. | |
| 7,974,844 B2 | 7/2011 | Sumita | |

(56) References Cited

U.S. PATENT DOCUMENTS

| | | |
|---|---|---|
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 8,711,585 B2 | 4/2014 | Copperman et al. |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0099547 A1 | 7/2002 | Chu et al. |
| 2002/0103641 A1 | 8/2002 | Kuo et al. |
| 2002/0164000 A1 | 11/2002 | Cohen et al. |
| 2002/0198714 A1 | 12/2002 | Zhou |
| 2003/0154081 A1 | 8/2003 | Chu et al. |
| 2004/0073427 A1 | 4/2004 | Moore |
| 2004/0135701 A1 | 7/2004 | Yasuda et al. |
| 2004/0236778 A1 | 11/2004 | Junqua et al. |
| 2005/0055403 A1 | 3/2005 | Brittan |
| 2005/0060155 A1 | 3/2005 | Chu et al. |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0059190 A1 | 3/2008 | Chu et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0306727 A1 | 12/2008 | Thurmair et al. |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |

(56) References Cited

U.S. PATENT DOCUMENTS

| | | | |
|---|---|---|---|
| 2011/0130958 | A1 | 6/2011 | Stahl et al. |
| 2011/0131036 | A1 | 6/2011 | Di Cristo et al. |
| 2011/0131045 | A1 | 6/2011 | Cristo et al. |
| 2011/0143811 | A1 | 6/2011 | Rodriguez |
| 2011/0144999 | A1 | 6/2011 | Jang et al. |
| 2011/0161076 | A1 | 6/2011 | Davis et al. |
| 2011/0161309 | A1 | 6/2011 | Lung et al. |
| 2011/0175810 | A1 | 7/2011 | Markovic et al. |
| 2011/0184730 | A1 | 7/2011 | LeBeau et al. |
| 2011/0218855 | A1 | 9/2011 | Cao et al. |
| 2011/0231182 | A1 | 9/2011 | Weider et al. |
| 2011/0231188 | A1 | 9/2011 | Kennewick et al. |
| 2011/0264643 | A1 | 10/2011 | Cao |
| 2011/0279368 | A1 | 11/2011 | Klein et al. |
| 2011/0306426 | A1 | 12/2011 | Novak et al. |
| 2012/0002820 | A1 | 1/2012 | Leichter |
| 2012/0016678 | A1 | 1/2012 | Gruber et al. |
| 2012/0020490 | A1 | 1/2012 | Leichter |
| 2012/0022787 | A1 | 1/2012 | LeBeau et al. |
| 2012/0022857 | A1 | 1/2012 | Baldwin et al. |
| 2012/0022860 | A1 | 1/2012 | Lloyd et al. |
| 2012/0022868 | A1 | 1/2012 | LeBeau et al. |
| 2012/0022869 | A1 | 1/2012 | Lloyd et al. |
| 2012/0022870 | A1 | 1/2012 | Kristjansson et al. |
| 2012/0022874 | A1 | 1/2012 | Lloyd et al. |
| 2012/0022876 | A1 | 1/2012 | LeBeau et al. |
| 2012/0023088 | A1 | 1/2012 | Cheng et al. |
| 2012/0034904 | A1 | 2/2012 | LeBeau et al. |
| 2012/0035908 | A1 | 2/2012 | LeBeau et al. |
| 2012/0035924 | A1 | 2/2012 | Jitkoff et al. |
| 2012/0035931 | A1 | 2/2012 | LeBeau et al. |
| 2012/0035932 | A1 | 2/2012 | Jitkoff et al. |
| 2012/0042343 | A1 | 2/2012 | Laligand et al. |
| 2012/0137367 | A1 | 5/2012 | Dupont et al. |
| 2012/0173464 | A1 | 7/2012 | Tur et al. |
| 2012/0265528 | A1 | 10/2012 | Gruber et al. |
| 2012/0271676 | A1 | 10/2012 | Aravamudan et al. |
| 2012/0311583 | A1 | 12/2012 | Gruber et al. |
| 2013/0110518 | A1 | 5/2013 | Gruber et al. |
| 2013/0110520 | A1 | 5/2013 | Cheyer et al. |

FOREIGN PATENT DOCUMENTS

| | | | |
|---|---|---|---|
| DE | 198 41 541 B4 | 12/2007 | |
| EP | 0138061 B1 | 9/1984 | |
| EP | 0138061 A1 | 4/1985 | |
| EP | 0218859 A2 | 4/1987 | |
| EP | 0262938 A1 | 4/1988 | |
| EP | 0293259 A2 | 11/1988 | |
| EP | 0299572 A2 | 1/1989 | |
| EP | 0313975 A2 | 5/1989 | |
| EP | 0314908 A2 | 5/1989 | |
| EP | 0327408 A2 | 8/1989 | |
| EP | 0389271 A2 | 9/1990 | |
| EP | 0411675 A2 | 2/1991 | |
| EP | 0559349 A1 | 9/1993 | |
| EP | 0559349 B1 | 9/1993 | |
| EP | 0570660 A1 | 11/1993 | |
| EP | 0863453 A1 | 9/1998 | |
| EP | 1245023 A1 | 10/2002 | |
| EP | 2 109 295 A1 | 10/2009 | |
| GB | 2293667 A | 4/1996 | |
| JP | 06 019965 | 1/1994 | |
| JP | 2001 125896 | 5/2001 | |
| JP | 2002 024212 | 1/2002 | |
| JP | 2003517158 A | 5/2003 | |
| JP | 2009 036999 | 2/2009 | |
| KR | 10-2007-0057496 | 6/2007 | |
| KR | 10-0776800 B1 | 11/2007 | |
| KR | 10-2008-001227 | 2/2008 | |
| KR | 10-0810500 B1 | 3/2008 | |
| KR | 10 2008 109322 A | 12/2008 | |
| KR | 10 2009 086805 A | 8/2009 | |
| KR | 10-0920267 B1 | 10/2009 | |
| KR | 10-2010-0032792 | 4/2010 | |
| KR | 10 2011 0113414 A | 10/2011 | |
| WO | WO 95/02221 | 1/1995 | |
| WO | WO 97/26612 | 7/1997 | |
| WO | WO 98/41956 | 9/1998 | |
| WO | WO 99/01834 | 1/1999 | |
| WO | WO 99/08238 | 2/1999 | |
| WO | WO 99/56227 | 11/1999 | |
| WO | WO 00/60435 | 10/2000 | |
| WO | WO 00/60435 A3 | 10/2000 | |
| WO | WO 02/073603 A1 | 9/2002 | |
| WO | WO 2006/129967 A1 | 12/2006 | |
| WO | WO 2008/085742 A2 | 7/2008 | |
| WO | WO 2008/109835 A2 | 9/2008 | |
| WO | WO 2011/088053 A2 | 7/2011 | |

OTHER PUBLICATIONS

Schmid, H. (1994). Part-of-speech tagging with neural networks.'In Proceedings Coling, Kyoto, Japan.*
Hinrich Sch utze. Distributional part-of-speech tagging. In EACL-95, 1995.*
J.R. Bellegarda. 2005. Latent Semantic Mapping, IEEE Signal Processing Magazine, 22(5):70-80.*
Chris Biemann. 2006. Unsupervised part-of-speech tagging employing efficient graph clustering. In Proceedings of the COLING/ACL 2006 Student Research Workshop.*
Nakagawa, T., T. kudoh and Y. Matsumoto, "Unknown Word Guessing and Part-of-speech Tagging Using Support Vector Machines," Proceedings of the 6th NLPRS, 2001, pp. 325-331.*
Silviu Cucerzan and David Yarowsky. 2002. Bootstrapping a multilingual part-of-speech tagger in one person-day. In proceedings of the 6th conference on Natural language learning—vol. 20 (COLING-02), vol. 20. Association for Computational Linguistics, Stroudsburg, PA, USA, 1-7.*
Patrick Schone and Daniel Jurafsky. 2000. Knowledge-free induction of morphology using latent semantic analysis. In Proceedings of the 2nd workshop on Learning language in logic and the 4th conference on Computational natural language learning—vol. 7 (ConLL '00), vol. 7. Association for Computational Linguistics, Stroudsburg, PA, USA, 67-72.*
Bellegarda, Jerome R. "Latent Semantic Mapping" IEEE Signal Processing Magazine, Sep. 2005 1053-5888/05 Copyright 2005 IEEE, pp. 2-13.
Lafferty, John, et al., "Conditional Random Fields: Probabilistic Models for Segmenting and Labeling Sequence Data", WhizBang! Labs-Research, Pittsburgh, PA, School of Computer Science, Carnegie Mellon University, Pittsburgh, PA, Dept. of Computer and Information Science, University of Pennsylvania, Philadelphia, PA. 8 pages, 2001.
Marcus, Mitchell P., et al., "Building a Large Annotated Corpus of English: The Penn Treebank", Copyright 1993 Association for Computational Linguistics, vol. 19, No. 2, 18 pages.
Toutanova, Kristina, et al., "Feature-Rich Part-of-Speech Tagging with a Cyclic Dependency Network", 8 pages. Computer Science Dept., Stanford University, Stanford CA. 94305-9040, 2003.
Sarawagi, S. "CRF Package for Java," http://crf.sourceforge.net, 2004, downloaded Apr. 6, 2011.
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.

(56) References Cited

OTHER PUBLICATIONS

Alshawi, H., et al., "Overview of the Core Language Engine," Sep. 1988, Proceedings of Future Generation Computing Systems, Tokyo, 13 pages.

Alshawi, H., "Translation and Monotonic Interpretation/Generation," Jul. 1992, SRI International, Cambridge Computer Science Research Centre, Cambridge, 18 pages, http://www.cam.sri.com/tr/crc0241paper.ps.Z_1992.

Appelt, D., et al., "Fastus: A Finite-state Processor for Information Extraction from Real-world Text," 1993, Proceedings of IJCAI, 8 pages.

Appelt, D., et al., "SRI: Description of the JV-FASTUS System Used for MUC-5," 1993, SRI International, Artificial intelligence Center, 19 pages.

Appelt, D., et al., 'SRI International Fastus System MUC-6 Test Results and Analysis, 1995, SRI International, Menlo Park, California, 12 pages Archbold, A., et al., "A Team User's Guide," Dec. 21, 1981, SRI International, 70 pages.

Bear, J., et al., "A System for Labeling Self-Repairs in Speech," Feb. 22, 1993, SRI International, 9 pages.

Bear, J., et al., "Detection and Correction of Repairs in Human-Computer Dialog," May 5, 1992, SRI international, 11 pages.

Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.

Bear, J., et al., "Using Information Extraction to Improve Document Retrieval," 1998, SRI International, Menlo Park, California, 11 pages.

Berry, P., et al., "Task Management under Change and Uncertainty Constraint Solving Experience with the CALO Project," 2005, Proceedings of CP'05 Workshop on Constraint Solving under Change, 5 pages.

Bobrow, R. et al., "Knowledge Representation for Syntactic/Semantic Processing," From: AAA-80 Proceedings. Copyright © 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.

Bratt, H., et al., "The SRI Telephone-based ATIS System," 1995, Proceedings of ARPA Workshop on Spoken Language Technology, 3 pages.

Bulyko, I. et al., "Error-Correction Detection and Response Generation in a Spoken Dialogue System," © 2004 Elsevier B.V., specom. 2004,09.009, 18 pages.

Burke, R., et al., "Question Answering from Frequently Asked Question Files," 1997, AI Magazine, vol. 18, No. 2, 10 pages.

Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.

Carter, D., "Lexical Acquisition in the Core Language Engine," 1989, Proceedings of the Fourth Conference of the European Chapter of the Association for Computational Linguistics, 8 pages.

Carter, D., et al., "The Speech-Language Interface in the Spoken Language Translator," Nov. 23, 1994, SRI International, 9 pages.

Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.

Cheyer, A., et al., "Multimodal Maps: An Agent-based Approach," International Conference on Cooperative Multimodal Communication, 1995, 15 pages.

Cheyer, A., et al., "The Open Agent Architecture," Autonomous Agents and Multi-Agent systems, vol. 4, Mar. 1, 2001, 6 pages.

Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.

Codd, E. F., "Databases: Improving Usability and Responsiveness—'How About Recently'," Copyright © 1978, by Academic Press, Inc., 28 pages.

Cohen, P. R., et al., "An Open Agent Architecture," 1994, 8 pages. http://citeseerx.ist.psu.edu/viewdoc/summary?doi=10.1.1.30.480.

Coles, L. S., et al., "Chemistry Question-Answering," Jun. 1969, SRI International, 15 pages.

Coles, L. S., "Techniques for Information Retrieval Using an lnferential Question-Answering System with Natural-Language Input," Nov. 1972, SRI International, 198 Pages.

Coles, L. S., "The Application of Theorem Proving to Information Retrieval," Jan. 1971, SRI International, 21 pages.

Constantinides. P., et al., "A Schema Based Approach to Dialog Control," 1998, Proceedings of the International Conference on Spoken Language Processing, 4 pages.

Cox, R. V., et al., "Speech and Language Processing for Next-Millennium Communications Services," Proceedings of the IEEE, vol. 88, No. 8, Aug. 2000, 24 pages.

Craig, J., et al., "Deacon: Direct English Access and Control," Nov. 7-10, 1966 AFIPS Conference Proceedings, vol. 19, San Francisco, 18 pages.

Dar, S., et al "DTL's DataSpot: Database Exploration Using Plain Language," 1998 Proceedings of the 24th VLDB Conference, New York, 5 pages.

Davis, Z., et al., "A Personal Handheld Multi-Modal Shopping Assistant," 2006 IEEE, 9 pages.

Decker, K., et al., "Designing Behaviors for Information Agents," The Robotics Institute, Carnegie-Mellon University, paper, Jul. 6, 1996, 15 pages.

Decker, K., et al., "Matchmaking and Brokering," The Robotics Institute, Carnegie-Mellon University, paper, May 16, 1996, 19 pages.

Dowding, J., et al., "Gemini: A Natural Language System for Spoken-Language Understanding," 1993, Proceedings of the Thirty-First Annual Meeting of the Association for Computational Linguistics, 8 pages.

Dowding, J., et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interlace Using Constrained Intermediate Dictionary of Results," Classes/Subclasses Manually Reviewed for the Search of US Patent No. 7/177,798, Mar. 22, 2013, 1 page.

Exhibit 1, "Natural Language Interlace Using Constrained Intermediate Dictionary of Results," List of Publications Manually reviewed for the Search of US Patent No. 7,177,798, Mar. 22, 2013, 1 page.

Ferguson, G., et al., "TRIPS: An Integrated Intelligent Problem-Solving Assistant," 1998, Proceedings of the Fifteenth National Conference on Artificial intelligence (AAAI-98) and Tenth Conference on Innovative Applications of Artificial Intelligence (IAAI-98), 7 pages.

Fikes, R., et al., "A Network-based knowledge Representation and its Natural Deduction System," Jul. 1977, SRI International, 43 pages.

Gambäck, B., et al., "The Swedish Core Language Engine," 1992 NOTEX Conference, 17 pages.

Glass, J., et al., "Multilingual Language Generation Across Multiple Domains," Sep. 18- 22, 1994, International Conference on Spoken Language Processing. Japan, 5 pages.

Green, C. "The Application of Theorem Proving to Question-Answering Systems," Jun. 1969, SRI Stanford Research Institute, Artificial Intelligence Group, 169 pages.

Gregg, D. G., "DSS Access on the WWW: An Intelligent Agent Prototype," 1998 Proceedings of the Americas Conference on Information Systems-Association for Information Systems, 3 pages.

Grishrnan, R., "Computafional Linguistics: An Introduction," © Cambridge University Press 1986, 172 pages.

Grosz, B. et al., "Dialogic: A Core Natural-Language Processing System," Nov. 9, 1982, SRI International, 17 pages.

Grosz, B. et al., "Research on Natural-Language Processing at SRI," Nov. 1981, SRI International, 21 pages.

(56) References Cited

OTHER PUBLICATIONS

Grosz, B., et al., "Team: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, a platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni. D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI international, 27 pages.
Hendrix, G., "Klaus: A System for Managing Information and Computational Resources,"Oct. 1980, SRI International, 34 pages.
Hendrix. G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992; Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Sprinter-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Katz, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages, 1991.
Larks, "Intelligent Softward Agents: Larks," 2006, dowloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language inferface to command languages," Natural Language Engineering 2 (3), © 1994 Cambridge University Press, 19 pages.
Milstead, J., et al., "Metadata: Cataloging by Any Other Name . . . " Jan. 1999, Online, Copyright © 1999 information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.

(56) References Cited

OTHER PUBLICATIONS

Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshos held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motto, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., et al.; "Adapting the Core Language Engine to French and Spanish," May 10, 1996, Cornell University Library, 9 pages. http://arxiv.org/abs/cmp-lg/9605015,.
Rayner, M., et al., "Abductive Equivalential Translation and its application to Natural Language Database Interfacing," Sep. 1993 Dissertation paper, SRI International, 163 pages.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.

Rudnicky, A.I., et al., "Creating Natural Dialogs in the Carnegie Mellon Communicator System," pp. 1-5, 1999.
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H. "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml
Starr, B., et al., "Knowledge-Intensive Query Processing," May 31, 1998, Proceedings of the 5th KRDB Workshop, Seattle, 6 pages.
Stern, R., et al., "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 199, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language Systems," May 1990, SRI International, Artificial Intelligence Center, 16 pages.
Wahister, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.

(56) References Cited

OTHER PUBLICATIONS

Ward, W., et al., "A Class Based Language Model For Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages, 1994.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth Internation Conference on Engineering (IEEE Cat. No. 89CH2695-5), 8 pages.
Yang, J., et al., "Smart Sight: A Tourist Assistant Systme," 1999 Procedings of Third International Symposium on Wearable Computers, 6 pages.
Zeng, D., et al., "Cooperative Intelligent Software Agents," The Robtics Institute, Carnegie-Mellon University, Mar. 1995, 13 pages.
Zhao, L., "Intelligent Agents for the Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Hunt, Andrew J., et al., "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan. 4 pages.
Klabbers, Esther, et al., "Reducing Audible Spectral Discontinuties", IEEE Transactions on Speech and Audio Processing, vol. 9, No. 1, Jan. 2001. 1063-6676/01 Copyright 2001 IEEE. pp. 39-51.
Bussler, C., et al., "Web Service Execution Environment (WSMX)," Jun. 3, 2005, W3C Member Submission, http://www.w3.org/Submission/WSMX, 29 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Roddy, D., et al., "Communication and Collaboration in a Landscape of B2B eMarketplaces," VerticalNet Solutions, white paper, Jun. 15, 2000, 23 pages.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc.* v. *West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.icsi.berkeley.edu, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

(56) References Cited

OTHER PUBLICATIONS

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al., "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.

Bellegarda, J. R., et al., "Experiments Using Data Augmentation for Speaker Adaptation," International Conference on Acoustics, Speech, and Signal Processing (ICASSP'95), May 9-12, 1995, 4 pages.

Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.

Bellegarda, J. R., "Exploiting Latent Semantic Information in Statistical Language Modeling," In Proceedings of the IEEE, Aug. 2000, vol. 88, No. 8, 18 pages.

Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.

Bellegarda, J. R., "Large Vocabulary Speech Recognition with Multispan Statistical Language Models," IEEE Transactions on Speech and Audio Processing, vol. 8, No. 1, Jan. 2000, 9 pages.

Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., Ed, Directions and Challenges, 15th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

Conklin, J., "Hypertext: An Introduction and Survey," Computer Magazine, Sep. 1987, 25 pages.

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

Deerwester, S., et al., "Indexing by Latent Semantic Analysis," Journal of the American Society for Information Science, vol. 41, No. 6, Sep. 1990, 19 pages.

Deller, Jr., J. R., et al., "Discrete-Time Processing of Speech Signals," © 1987 Prentice Hall, ISBN: 0-02-328301-7, 14 pages.

Digital Equipment Corporation, "Open VMS Software Overview," Dec. 1995, software manual, 159 pages.

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.

Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.

Gorin, A. L., et al., "On Adaptive Acquisition of Language," International Conference on Acoustics, Speech, and Signal Processing (ICASSP'90), vol. 1, Apr. 3-6, 1990, 5 pages.

Gotoh, Y., et al., "Document Space Models Using Latent Semantic Analysis," In Proceedings of Eurospeech, 1997, 4 pages.

Gray, R. M., "Vector Quantization," IEEE ASSP Magazine, Apr. 1984, 26 pages.

Harris, F. J., "On the Use of Windows for Harmonic Analysis with the Discrete Fourier Transform," In Proceedings of the IEEE, vol. 66, No. 1, Jan. 1978, 34 pages.

Helm, R., et al., "Building Visual Language Parsers," In Proceedings of CHI'91 Proceedings of the SIGCHI Conference on Human Factors in Computing Systems, 8 pages.

Hermansky, H., "Perceptual Linear Predictive (PLP) Analysis of Speech," Journal of the Acoustical Society of America, vol. 87, No. 4, Apr. 1990, 15 pages.

Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.

Hoehfeld M., et al., "Learning with Limited Numerical Precision Using the Cascade-Correlation Algorithm," IEEE Transactions on Neural Networks, vol. 3, No. 4, Jul. 1992, 18 pages.

(56) References Cited

OTHER PUBLICATIONS

Holmes, J. N., "Speech Synthesis and Recognition—Stochastic Models for Word Recognition," Speech Synthesis and Recognition, Published by Chapman & Hall., London, ISBN 0 412 534304, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties," dspGuro, Digital Signal Processing Central, http://www.dspguru.com/dsp/taqs/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, An Experimental Speech-to-Speech Dialog Translation System," Jun. 1991 Computer, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The Sphinx System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997 http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

(56) References Cited

OTHER PUBLICATIONS

Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," Byte, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, http://en.wikipedia.org/wiki/Mel_scale, 2 pages.
Wikipedia, "Minimum Phase," Wikipedia, the free encyclopedia, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C. I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages. (Robert Don Strong).
International Preliminary Examination Report dated Mar. 1, 1995, received in International Application No. PCT/US1993/12666, which corresponds to U.S. Appl. No. 07/999,302, 5 pages. (Robert Don Strong).
International Preliminary Examination Report dated Apr. 10, 1995, received in International Application No. PCT/US1993/12637, which corresponds to U.S. Appl. No. 07/999,354, 7 pages. (Alejandro Acero).
International Search Report dated Feb. 8, 1995, received in International Application No. PCT/US1994/11011, which corresponds to U.S. Appl. No. 08/129,679, 7 pages. (Yen-Lu Chow).
International Preliminary Examination Report dated Feb. 28, 1996, received in International Application No. PCT/US1994/11011, which corresponds to U.S. Appl. No. 08/129,679, 4 pages. (Yen-Lu Chow).
Written Opinion dated Aug. 21, 1995, received in International Application No. PCT/US1994/11011, which corresponds to U.S. Appl. No. 08/129,679, 4 pages. (Yen-Lu Chow).
International Search Report dated Nov. 8, 1995, received in International Application No. PCT/US1995/08369, which corresponds to U.S. Appl. No. 08/271,639, 6 pages. (Peter V. De Souza).
International Preliminary Examination Report dated Oct. 9, 1996, received in International Application No. PCT/US1995/08369, which corresponds to U.S. Appl. No. 08/271,639, 4 pages. (Peter V. De Souza).
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Seman-

(56) References Cited

OTHER PUBLICATIONS tics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, 10 pages, 1999.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: The one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992,

(56) References Cited

OTHER PUBLICATIONS from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, a Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Guzzoni, D., et al., "Active, a Tool for Building Intelligent User Interfaces," ASC 2007, Palma de Mallorca, http://lsro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "Trio: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages, 1996.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen to and Send E-Mail 'by Voice' www.voiceassist.com," 2:11 minute video uploaded to YouTube by VoiceAssist on Jul 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages (Thomas Robert Gruber).

\* cited by examiner

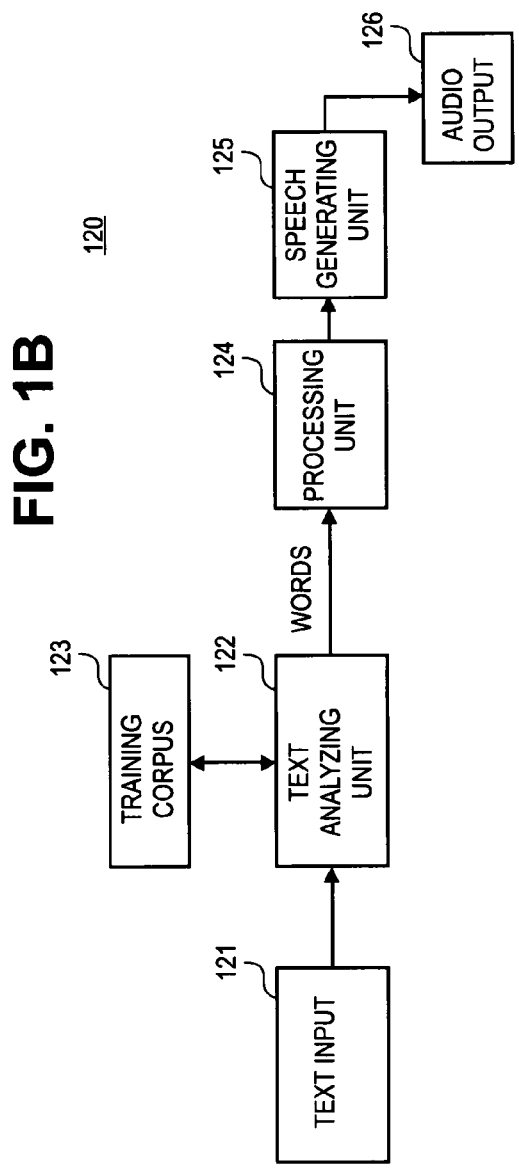

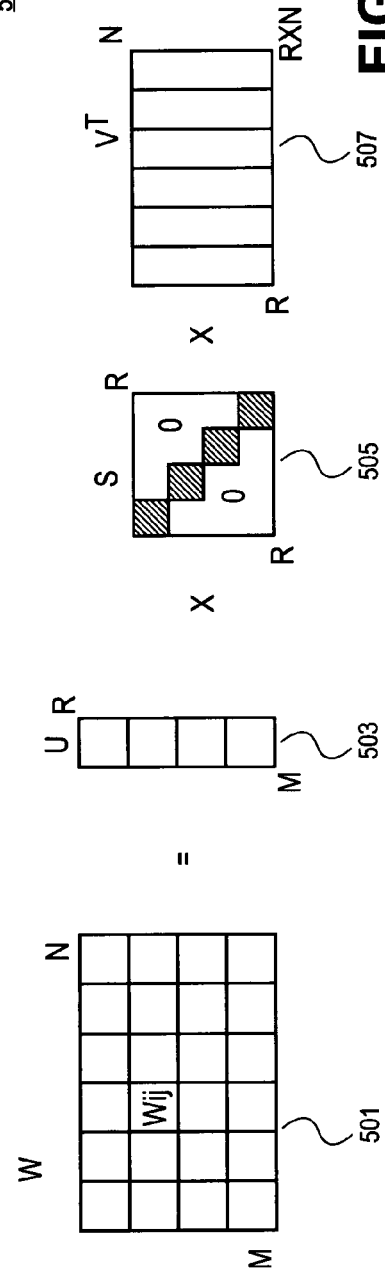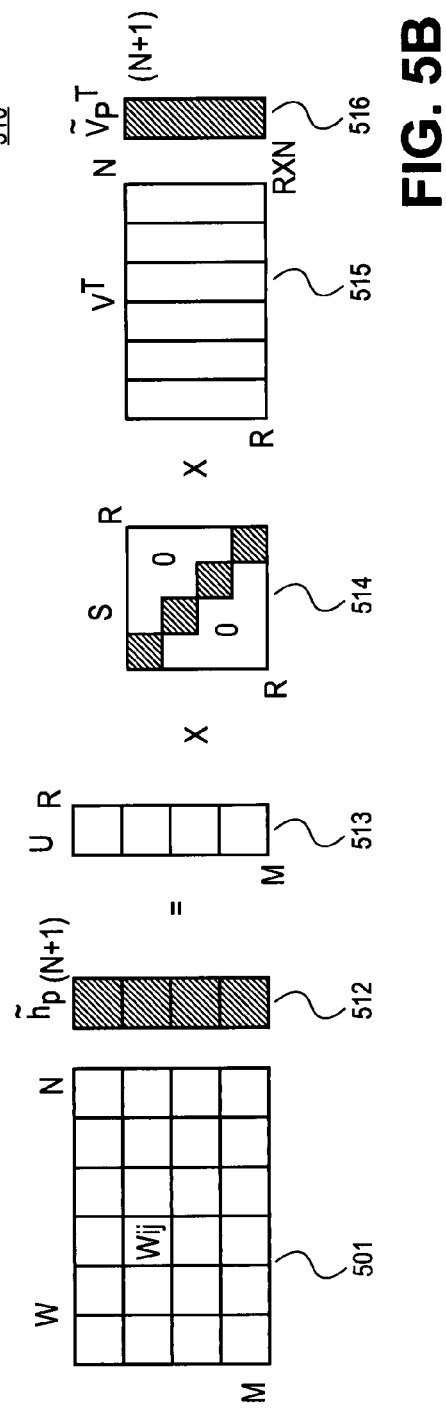

Table I.

| | |
|---|---|
| 701 | jet/NN propulsion/NN also/RB makes/VBZ flight/NN possible/JJ at/IN extremely/RB high/JJ altitudes/NNS ,/, and/CC even/RB in/IN outer/JJ space/NN<br>these/DT superalloys/NNS are/VBP important/JJ components/NNS of/IN jet/NN engines/NNS and/CC spacecraft/NN |
| 702 | high-speed/JJ streams/NNS of/IN the/DT solar/JJ wind/NN appear/VBP as/IN the/DT sun/NN 's/POS activity/NN increases/NNS this/DT device/NN sprays/VBZ streams/NNS of/IN vapor/NN that/WDT sweep/VBP gas/NN molecules/NNS out/IN of/IN the/DT enclosed/VBN space/NN<br>grade/NN separations/NNS are/VBP often/RB used/VBN to/TO separate/VB crossing/BVG streams/NNS of/IN traffic/NN |
| 703 | extremely/RB strong/JJ winds/NNS blow/VBP in/IN this/DT layer/NN<br>waterline/NNP and/OC trade/NN winds/NNS blow/VBP away/RB from/IN the/DT thirty/CD degrees/NNS latitude/VBP belt/NN similar/JJ winds/NNS that/WDT blow/VBP in/IN other/JJ parts/NNS of/IN the/DT world/NN are/VBP called/VBN foehns/NNS |
| 704 | the/DT temperature/NN in/IN a/DT thin/JJ layer/NN of/IN the/DT troposphere/NN then/RB increases/VBE with/IN altitude/NN other/JJ parts/NNS of/IN the/DT atmosphere/NN are/VBP above/IN the/DT troposphere/NN<br>most/JJS clouds/NNS occur/VBP within/IN the/DT troposphere/NN |

FIG. 7

PART-OF-SPEECH TAGGING USING LATENT ANALOGY

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright ©2007, Apple Inc., All Rights Reserved.

FIELD OF THE INVENTION

The present invention relates generally to language processing. More particularly, this invention relates to automatic discovery of the syntactic structure in language.

BACKGROUND

Part-of-speech ("POS") tagging is used in many natural language processing ("NLP") tasks. As POS tags augment the information contained within words by indicating some of the structure inherent in language, their accuracy is often critical to NLP applications. In text-to-speech (TTS) synthesis POS information is often relied upon to determine how to pronounce a word properly. A word may be pronounced differently depending on a part of speech and/or a tense. For example, a word "read" may be pronounced differently depending on a tense. A word "advocate" may be pronounced differently depending on whether the word "advocate" is a noun or verb.

POS tags may help to decide whether the synthesized word should be accented or not. For example, a noun may be accented more than a verb. Accordingly, POS tags may greatly influence how natural synthetic speech sounds. Typically, a POS tag is assigned to a word based on the local information contained in a text. For example, to assign a POS tag to a word in the text, adjacent words are typically considered.

Conceptually, the POS tags may be assigned to words in a text according to predetermined rules. For example, if a determiner, such as "the" or "a", precedes a word in the text, than the word may be assigned an adjective or a noun tag. In another example, if word "to" precedes a word in the text, than the word may be assigned a verb tag.

In the past, numerous rules were manually generated for the POS tagging. An answer to one rule, however, may conflict with the answer to another rule. Accordingly, the POS tagging may strongly depend on how the rules are ordered. Accordingly, the accuracy of the POS tagging by rules may be poor.

Current methods of POS tagging involve sophisticated statistical models, such as maximum entropy Markov models ("MEMMs") and conditional random fields ("CRFs"). Both types of modeling rely on a set of feature functions to ensure that important characteristics of the empirical training distribution are reflected in the trained model. These types of modeling, however, may suffer directly or indirectly from the so-called "label bias problem", whereby certain characteristics are unduly favored over other characteristics.

Hence, the tagging accuracy of both MEMMs and CRFs may depend on how many feature functions are selected and how relevant they are to the task at hand. Such selection may require application-specific linguistic knowledge, complicating deployment across different applications. Moreover, it is basically impossible to specify a set of feature functions that will work well in every environment. For example, a set of feature functions that is selected for the POS tagging of the text from the Wall Street Journal may not be appropriate for the POS tagging of the text from the Word Book Encyclopedia, or from a web blog. Typically, the accuracy of both MEMMs and CRFs may increase as the number of feature functions increases. Increasing the number of feature functions to assign POS tags to words in the text dramatically increases the processing time and/or work load on the processing resources and may be very expensive.

SUMMARY OF THE DESCRIPTION

Methods and apparatuses to assign part-of-speech tags to words are described. An input sequence of words, for example, a sentence, is received. A global fabric of a training corpus containing training sequences of words is analyzed in a vector space. The vector space may include a latent semantic ("LS") space. Global semantic information associated with the input sequence of words is extracted based on the analyzing. A part-of-speech ("POS") tag is assigned to a word of the input sequence based on POS tags from words in training sequences that are identified using the global semantic information. In one embodiment, analyzing of the global fabric of the training corpus is performed using a latent semantic mapping. In one embodiment, the global semantic information is used to identify which training sequences from the training corpus are globally relevant. In one embodiment, the characteristics of the words of the identified training sequences that are globally relevant to the input sequence are obtained. In one embodiment, the characteristics of the words of the training sequences that are globally relevant to the input sequence include part-of-speech characteristics.

In one embodiment, an input sequence of words is mapped into a vector space. The vector space may include representations of a plurality of training sequences of words. A neighborhood associated with the input sequence may be formed in the vector space. The neighborhood may represent one or more training sequences of the corpus that are globally relevant to the input sequence. A part-of-speech tag to assign to a word of the input sequence may be determined based on characteristics of the words of the training sequences from the neighborhood.

In one embodiment, an input sequence is mapped into a vector space, for example, a LS space. The vector space may include representations of a plurality of training sequences of words. A closeness measure between each of the training sequences and the input sequence may be determined in the vector space. One or more training sequences may be selected out of the plurality of the training sequences based on the closeness measure, to form the neighborhood of the input sequence in the vector space. The neighborhood may represent one or more training sequences of a training corpus that are globally relevant to the input sequence. A part-of-speech tag to assign to the word of the input sequence may be determined based on one or more part-of-speech characteristics of words from the training sequences represented in the neighborhood.

In one embodiment, an input sequence is mapped into a vector space, for example, a LS space. The vector space may include representations of a plurality of training sequences of words. A neighborhood of the input sequence in the vector space is formed. The neighborhood of the input sequence in the vector space may contain representations of the training sequences that are globally relevant to the input sentence. In one embodiment, determination is made whether a training sequence in the neighborhood contains a word that is similar to an input word of the input sequence. One or more sub-sequences of the training sequence that contain one or more words that are similar to the input words of the input sequence are determined. The one or more sub-sequences that contain the words that are similar to the input words may be aligned to obtain one or more part-of-speech characteristics. One or more part-of-speech tags to assign to one or more words of the input sequence may be determined based on the one or more part-of-speech characteristics.

Other features will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 1B shows a block diagram illustrating a data processing system to assign POS tags to words to perform natural language processing according to another embodiment of the invention.

FIG. 5A shows a diagram that illustrates a singular value decomposition ("SVD") of a matrix W to construct a vector space according to one embodiment of invention.

FIG. 5B shows a diagram that illustrates mapping of an input sequence of words into a latent semantic mapping vector space according to one embodiment of the invention.

FIG. 7 shows an example of sentence neighborhood according to one embodiment of the invention.

DETAILED DESCRIPTION

The subject invention will be described with references to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Methods and apparatuses to assign part-of-speech ("POS") tags to words using a latent analogy and a system having a computer readable medium containing executable program code to assign part-of-speech tags to words using a latent analogy are described below. Other methods and other features are also described. A machine-readable medium may include any mechanism for storing information in a form readable by a machine (e.g., a computer). For example, a machine-readable medium includes read only memory ("ROM"); random access memory ("RAM"); magnetic disk storage media; optical storage media; and flash memory devices.

Figure 1A:
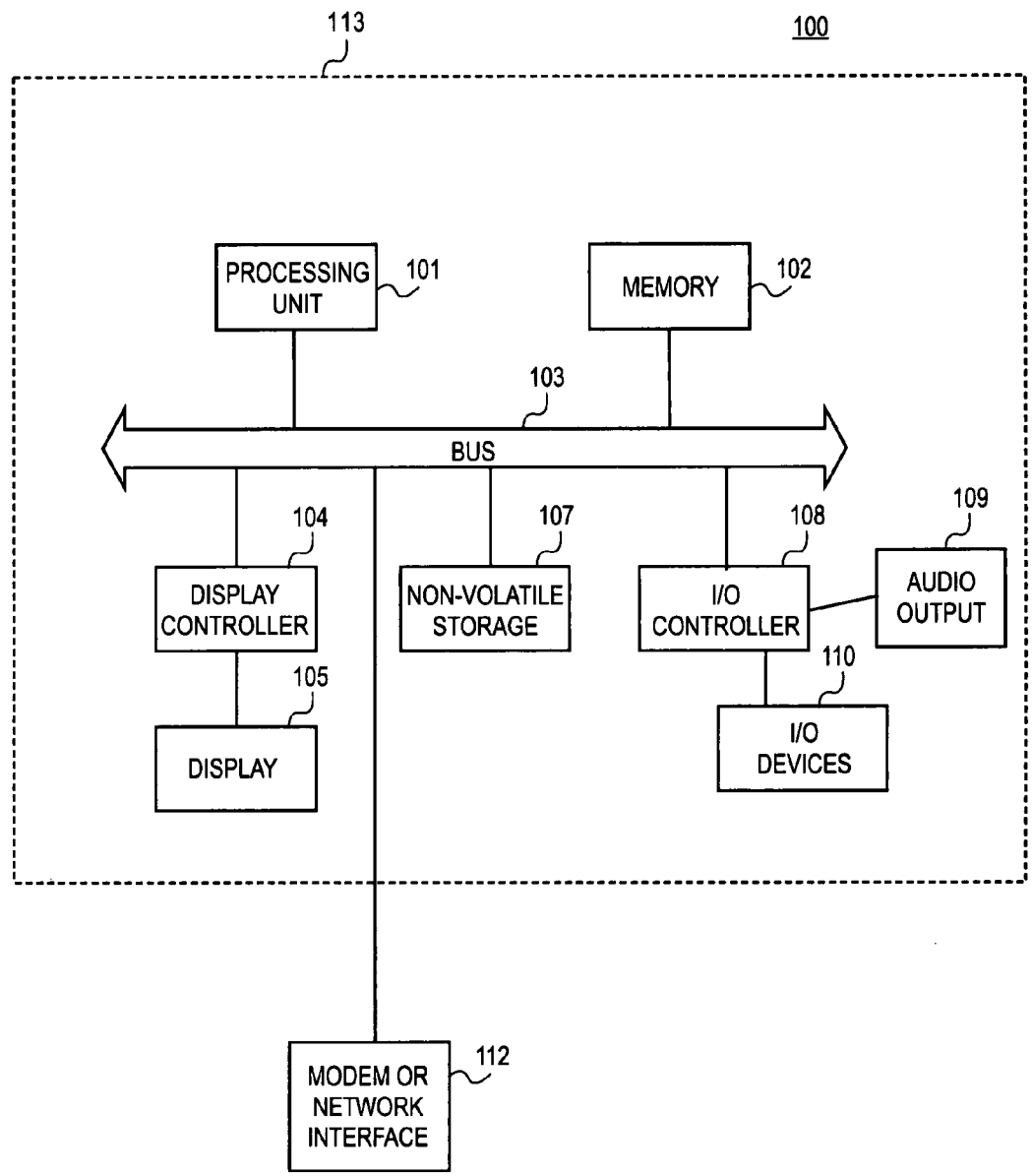
FIG. 1A shows a block diagram of a data processing system to assign part-of-speech ("POS") tags to words to perform natural language processing according to one embodiment of invention.

FIG. 1A shows a block diagram 100 of a data processing system to assign POS tags to words to perform natural language processing according to one embodiment of invention. Data processing system 113 includes a processing unit 101 that may include a microprocessor, such as an Intel Pentium® microprocessor, Motorola Power PC® microprocessor, Intel Core™ Duo processor, AMD Athlon™ processor, AMD Turion™ processor, AMD Sempron™ processor, and any other microprocessor. Processing unit 101 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. For one embodiment, processing unit 101 includes a general purpose data processing system based on the PowerPC®, Intel Core™ Duo, AMD Athlon™, AMD Turion™ processor, AMD Sempron™, HP Pavilion™ PC, HP Compaq™ PC, and any other processor families. Processing unit 101 may be a conventional microprocessor such as an Intel Pentium microprocessor or Motorola Power PC microprocessor.

As shown in FIG. 1A, memory 102 is coupled to the processing unit 101 by a bus 103. Memory 102 can be dynamic random access memory (DRAM) and can also include static random access memory (SRAM). A bus 103 couples processing unit 101 to the memory 102 and also to non-volatile storage 107 and to display controller 104 and to the input/output (I/O) controller 108. Display controller 104 controls in the conventional manner a display on a display device 105 which can be a cathode ray tube (CRT) or liquid crystal display (LCD). The input/output devices 110 can include a keyboard, disk drives, printers, a scanner, and other input and output devices, including a mouse or other pointing device. One or more input devices 110, such as a scanner, keyboard, mouse or other pointing device can be used to input a text for speech synthesis. The display controller 104 and the I/O controller 108 can be implemented with conventional well known technology. An audio output 109, for example, one or more speakers may be coupled to an I/O controller 108 to produce speech. The non-volatile storage 107 is often a magnetic hard disk, an optical disk, or another form of storage for large amounts of data. Some of this data is often written, by a direct memory access process, into memory 102 during execution of software in the data processing system 113. One of skill in the art will immediately recognize that the terms "computer-readable medium" and "machine-readable medium" include any type of storage device that is accessible by the processing unit 101. A data processing system 113 can interface to external systems through a modem or network interface 112. It will be appreciated that the modem or network interface 112 can be considered to be part of the data processing system 113. This interface 112 can be an analog modem, ISDN modem, cable modem, token ring interface, satellite transmission interface, or other interfaces for coupling a data processing system to other data processing systems.

It will be appreciated that data processing system 113 is one example of many possible data processing systems which have different architectures. For example, personal computers based on an Intel microprocessor often have multiple buses, one of which can be an input/output (I/O) bus for the peripherals and one that directly connects the processing unit 101 and the memory 102 (often referred to as a memory bus). The buses are connected together through bridge components that perform any necessary translation due to differing bus protocols.

Network computers are another type of data processing system that can be used with the embodiments of the present invention. Network computers do not usually include a hard disk or other mass storage, and the executable programs are loaded from a network connection into the memory 102 for execution by the processing unit 101. A Web TV system, which is known in the art, is also considered to be a data processing system according to the embodiments of the present invention, but it may lack some of the features shown in FIG. 1A, such as certain input or output devices. A typical data processing system will usually include at least a processor, memory, and a bus coupling the memory to the processor.

It will also be appreciated that the data processing system 113 is controlled by operating system software which includes a file management system, such as a disk operating system, which is part of the operating system software. One example of operating system software is the family of operating systems known as Macintosh® Operating System (Mac OS®) or Mac OS X® from Apple Inc. of Cupertino, Calif. Another example of operating system software is the family of operating systems known as Windows® from Microsoft Corporation of Redmond, Wash., and their associated file management systems. The file management system is typically stored in the non-volatile storage 107 and causes the processing unit 101 to execute the various acts required by the operating system to input and output data and to store data in memory, including storing files on the non-volatile storage 107.

FIG. 1B shows a block diagram illustrating a data processing system 120 to assign POS tags to words to perform natural language processing according to another embodiment of the invention. As shown in FIG. 1B, the POS tags are assigned to words to perform a concatenative text-to-speech ("TTS") synthesis. A text analyzing unit 122 receives a text input 121, for example, one or more sentences, paragraphs, and the like, and analyzes the text to extract words according to one embodiment of the invention. Analyzing unit 122 determines characteristics of a word, for example a pitch, duration, accent, and part-of-speech characteristic according to one embodiment of the invention. The part-of-speech characteristic typically defines whether a word in a sentence is, for example, a noun, verb, adjective, preposition, and/or the like. The POS characteristics may be very informative, and sometimes are the only way to distinguish a word from the word candidates for speech synthesis. In one embodiment, analyzing unit 122 determines input word's characteristics, such as a pitch, duration, and/or accent based on the POS characteristic of the input word. In one embodiment, analyzing unit 122 analyzes text input 121 to determine a POS characteristic of a word of input text 121 using a latent semantic analogy, as described in further details below with respect to FIGS. 2-12.

As shown in FIG. 1B, system 120 includes a training corpus 123 that contains a pool of training words and training word sequences. Training corpus 123 may be stored in a memory incorporated into text analyzing unit 122, and/or be stored in a separate entity coupled to text analyzing unit 122. In one embodiment, text analyzing unit 122 determines a POS characteristic of a word from input text 121 by selecting one or more word sequences from the training corpus 123 using latent semantic analogy, as described below. In one embodiment, text analyzing unit 122 assigns POS tags to input words of input text 121 as described in further details below. Generally, the text analyzing unit, such as text analyzing unit 122, may assign POS tags to input words of the input text, such as input text 121, for many natural language processing ("NLP") applications, for example, from low-level applications, such as grammar checking and text chunking, to high-level applications, such as text-to-speech synthesis ("TTS") (as shown in FIG. 1B), speech recognition and machine translation applications.

As shown in FIG. 1B, text analyzing unit 122 passes extracted words having assigned POS tags to processing unit 124. In one embodiment, processing unit 124 concatenates extracted words together, smoothes the transitions between the concatenated words, and passes the concatenated words to a speech generating unit 125 to enable the generation of a naturalized audio output 126, for example, an utterance, spoken paragraph, and the like.

Given a natural language sentence comprising z words, POS tagging aims at annotating each observed word $w_i$ with some suitable part-of-speech $p_i$, (each typically associated with a particular state $s_i$, $1 \leq i \leq z$). Representing the overall sequence of words by W and the corresponding sequence of POS by P, typical statistical models try to maximize the conditional probability Pr (P/W) over all possible POS sequences P.

Maximum entropy models such as MEMMs and CRFs approach this problem by considering state-observation transition distributions expressed as log-linear models of the form:

$$Pr_{s_i}(s_{i+1} | w_i) = \frac{1}{Z(S, W)} \exp\left[\sum_k \lambda_k f_k(C_i, w_i)\right] \quad (1)$$

which represent the probability of moving from state $s_i$ to state $s_{i+1}$ conditioned upon observation $w_i$. In expression (1), $f_k(C_i, w_i)$ is a feature function of the current observation and any entity belonging to the appropriate clique $C_i$ of the underlying undirected graph, $\lambda_k$ is a parameter to be estimated, and Z(S, W) is a normalization factor. Each feature function expresses some characteristic of the empirical training distribution, which is deemed important to require of the trained model as well. For natural language, however, it is essentially impossible to achieve a systematic and exhaustive determination of empirical importance. In practice, this means that the accuracy of models like expression (1) is largely contingent on the pertinence of the feature functions selected for the particular task at hand.

The usual way out of this dilemma is to throw in as many feature functions as computational resources will allow. Even so, due to the intrinsic lopsided sparsity of language, many distributional aspects will still be missing. And therefore, in those specific contexts where they happen to matter, this may result in erroneous tagging. Consider, for example, the sentence:

Jet streams blow in the troposphere. (2)

The correct tagging for sentence (2) would read as follows:

jet/NN streams/NNS blow/VBP in/IN the/DT troposphere/NN (3)

In expression (3) POS tag "NN" may indicate a noun singular, POS tag "NNS" may indicate a noun with a plural, POS tag "VBP" may indicate a verb in present tense, and POS tag "IN" may indicate a preposition. POS tags are known to one of ordinary skill in the art of natural language processing.

The CRF model provides, however, the following POS tagging:

jet/NN streams/VBZ blow/NN in/IN the/DT troposphere/NN (4)

As expression (4) indicates, CRF model incorrectly resolves the inherent POS ambiguity in the sub-sequence "streams blow." As shown in (4), word "streams" is assigned a tag VBZ that is third person verb instead of tag NN, as shown in (3) Word "blow" is assigned a tag NN instead of tag VBP, as shown in (3). The problem is that from purely a syntactic viewpoint both interpretations are perfectly acceptable (a frequent situation due to the many dual noun-verb possibilities in English).

What would clearly help in this case is taking into account the semantic information available. Indeed the word "troposphere," for example, would seem to make the verbal usage of "blow" substantially more likely. That is, the semantic of the sentence (2) can be used to disambiguate between two sequences of words, such as sequence (3) and sequence (4). The semantic information may include a general topic of the sentence and meaning of the words in the sentence.

For example, the semantic information may be obtained from determination whether words "jet" and "streams" mostly co-occur in a database, such that word "jet" is in most of the times accompanied by word "streams" and vice versa. If the words "jet" and "streams" mostly co-occur, then it means that "jet stream" is a compound. That is, the meaning of the words "jet" and "streams" in the input sentence (2) can be determined. The POS tags may be assigned to words "jet" and "streams" based on the determined meaning of the words, and/or the general topic of the sentence. Tagging using latent analogy may be an attempt to systematically generalize this observation, as described in further detail below.

Semantic information can be extracted from an analysis of the global fabric of the training corpus of word sequences. In one embodiment, the analysis of the global fabric of the training corpus is performed using latent semantic mapping. For each sequence of words under consideration, a neighborhood of globally relevant training word sequences may be generated. For example, the neighborhood of the globally relevant training word sequences may be the training sequences that belong to the same general topic, as the sequence of words under consideration.

The POS characteristics of the words of the globally relevant training word sequences from the neighborhood may be extracted. The POS characteristics of the globally relevant training sequences may be used to assign POS tags to the words of the sequence under consideration. The POS disambiguation may emerge automatically as a by-product of latent semantic mapping ("LSM")-based semantic consistency, which practically bypasses the need for an explicit linguistic knowledge. Additionally, POS tagging using latent analogy takes substantially less time than currently available methods, such as MEMMs and CRFs, described above.

Figure 9:
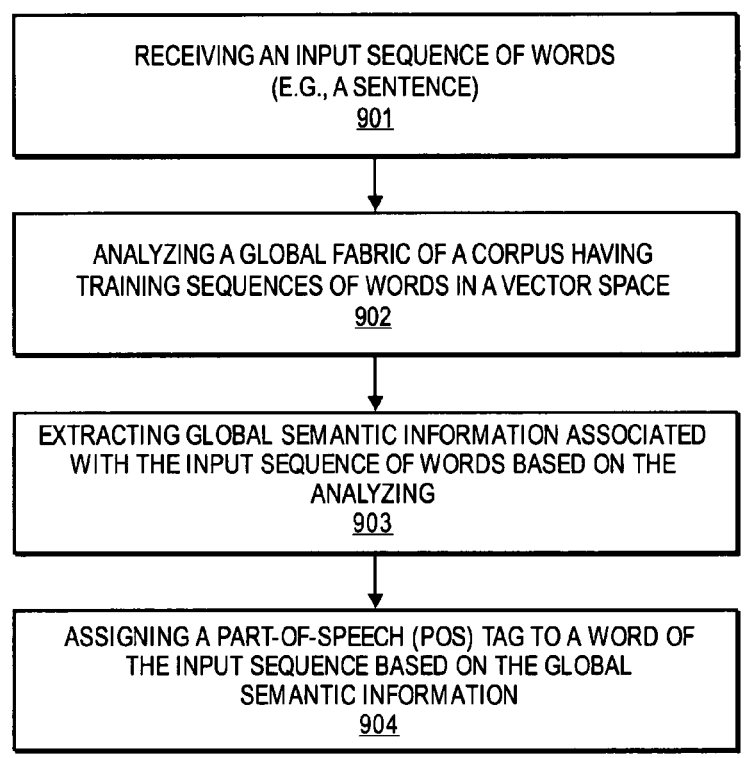
FIG. 9 shows a flowchart of a method to assign POS tags to words of an input text using latent analogy according to one embodiment of the invention.

FIG. 9 shows a flowchart of a method to assign POS tags to words of an input text using latent analogy according to one embodiment of the invention. Method 900 begins with operation 901 that includes receiving an input sequence of words, as described above with respect to FIG. 1B. In one embodiment, an input sequence of words may be a sentence, paragraph, or any other sequence of words. Method 900 continues with operation 902 that involves analyzing a global fabric of a training corpus having training sequences of words in a vector space, for example, a latent semantic ("LS") space.

In one embodiment, the analysis of the global fabric of the training corpus is performed using latent semantic mapping. In one embodiment, the analyzing of the global fabric of the training corpus in the vector space comprises mapping the input sequence into the vector space, and forming a neighborhood associated with the input sequence in the vector space. In one embodiment, the neighborhood associated with the input sequence of words in the vector space represents one or more training sequences that are globally relevant to the input sequence, as described in further detail below. In one embodiment, the one or more training sequences that are globally relevant to the input sequence are the training sentences that have the substantially the same general topic, as the input sequence of words. In one embodiment, the analyzing of the global fabric of the training corpus in the vector space comprises determining a closeness measure between the training sequences and the input sequence in the vector space, as described in further detail below.

Figure 2:
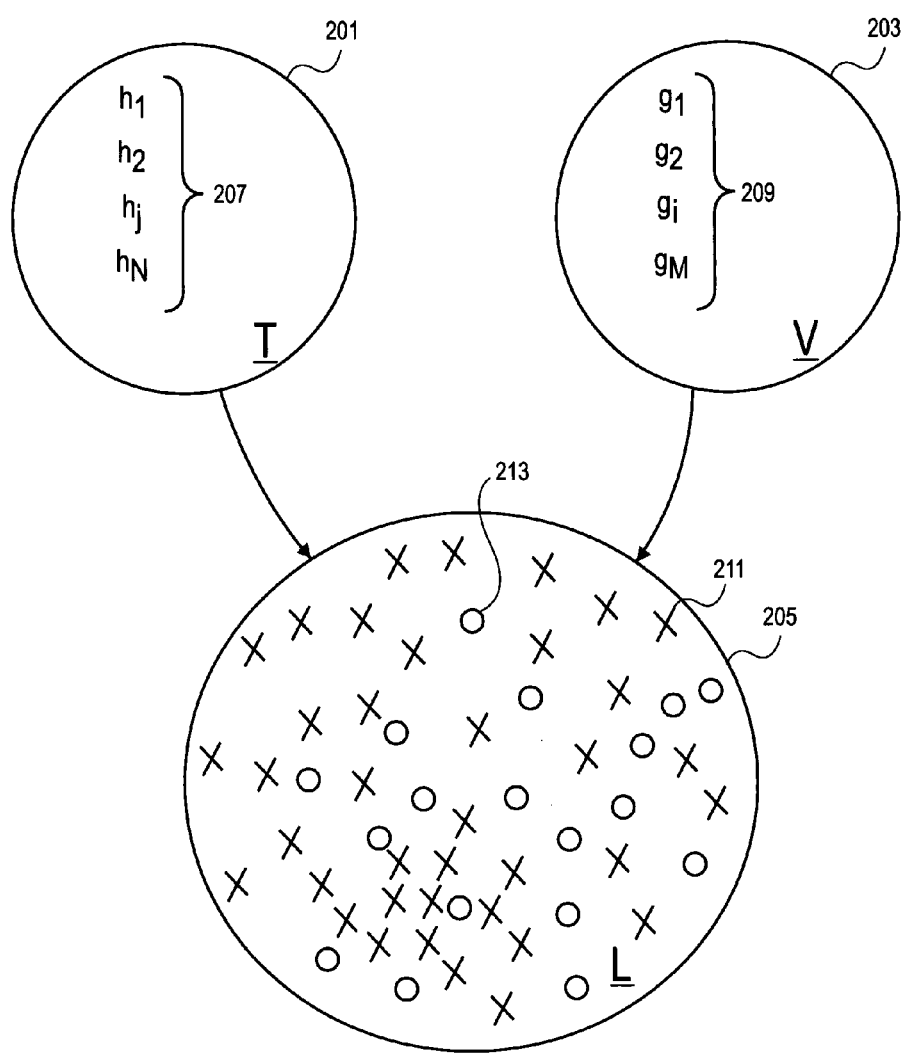
FIG. 2 shows an overview of one embodiment of a vector space.

FIG. 2 shows an overview 200 of one embodiment of a vector space. As shown in FIG. 2, a training corpus 201 includes a collection T of N training sequences of words (for example, sentences) hj 207, where N may be any number. In one embodiment, N ranges from about 100 to about 50,000. As shown in FIG. 2, a set V 203 associated with training corpus 201 includes M n-grams gi 209 observed in the collection T including proper markers for punctuation, etc, where M may be any number. In one embodiment, M ranges from about 1,000 to about 1,000,000. Typically, n-grams gi 209 are words, and strings of words, such as bigrams, trigrams, and the like. N-grams are known to one of ordinary skill in the art of language processing. In one embodiment, the set V 203 includes the underlying vocabulary (e.g., words) if n=1. In one embodiment, each word in the N training sequences of words hj 207 has been annotated with a POS tag. As shown in FIG. 2, the training corpus 201 and an associated set V 203 of M n-grams gi observed in the training corpus T 201 are mapped into a vector space L 205, whereby each sequence hj in a collection T and each n-gram gi in set V 203 is represented by a vector.

As shown in FIG. 2, vector space 205 includes vector representations of training sequences of words hj 207, such as a vector representation 211 illustrated by a cross, and vector representations of n-grams gi 209, such as a vector representation 213 illustrated by a circle. The continuous vector space L 205 is semantic in nature, because the "closeness" of vectors in the space L 205 is determined by the global pattern of the language used in the training corpus 201, as opposed to local specific constructs. For example, two words whose representations are "close" (in some suitable metric) tend to appear in the same kind of sentences, whether or not they actually occur within identical word contexts in those sentences. Two word sequences (e.g., sentences) whose representations are "close" tend to convey the same semantic meaning, whether or not they contain substantially the same word constructs. More generally, word and sentence vectors 213 and 211 associated with words 209 and sentences 207 that are semantically linked are also "close" in the space L 205. In one embodiment, vector space L 205 is a latent semantic ("LS") space.

Figure 3:
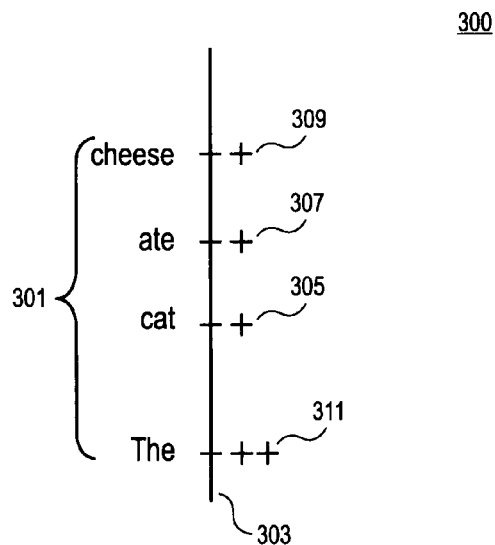
FIG. 3 shows a schematic that illustrates one embodiment of forming a matrix W using a training corpus and a set of n-grams.

FIG. 3 illustrates one embodiment of forming a matrix W using a training corpus and a set of n-grams. For an example shown in FIG. 3 n-grams are words (n=1). In one embodiment, matrix W is formed to contain elements that reflect how many times each n-gram from set 203 appears in the training corpus T 201. As shown in FIG. 3, matrix W may be constructed such that each unit of training data, for example, the words of sentence "The cat ate the cheese" may be arranged in a column 301. As shown in FIG. 3, counts 305, 307, 309, and 311 reflect the extent to which each word appears in the sentence "The cat ate the cheese". As shown in FIG. 3, count 311 reflects the fact that word "the" appears in the sentence twice, and counts 305, 307, and 309 reflect the fact that corresponding words "cat", "ate" and "cheese" appear in the sentence once.

Figure 4:
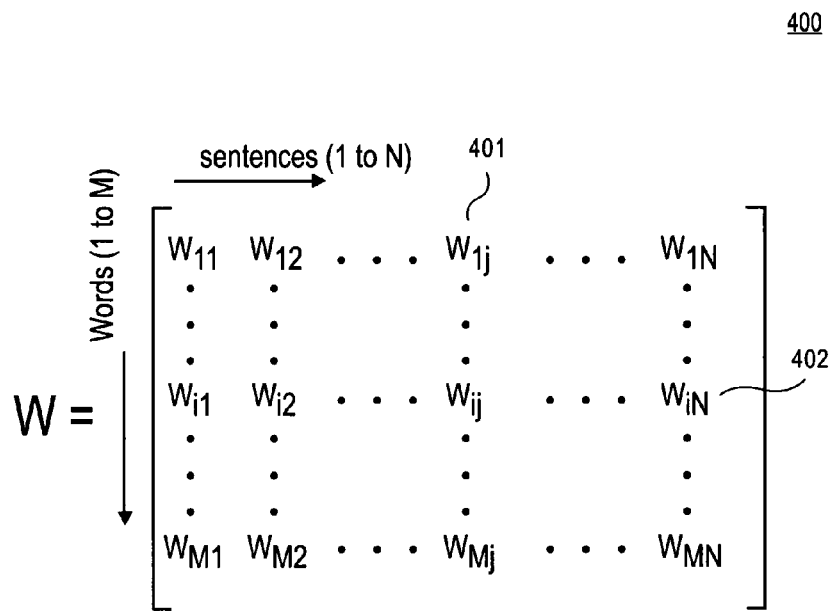
FIG. 4 illustrates one embodiment of a matrix W that has entries that reflect the extent to which each n-gram appears in the training corpus.

FIG. 4 illustrates one embodiment of a matrix W that has entries that reflect the extent to which each n-gram from set 203 appears in the training corpus T 201. As shown in FIG. 4, matrix W contains (M×N) entries wij that may reflect the extent to which each n-gram gi 207 ∈ V 203 appeared in each sentence hj 207∈ T 201. As shown in FIG. 4, 1 to N columns of matrix W, such as column 401, correspond to sequences of words hj 207, for example, sentences. As shown in FIG. 4, 1 to M rows of matrix W, such as row 402, correspond to n-grams gi 207, for example, words, bigrams, such as "Hong Kong" and trigrams, such as "New York City".

Each entry $w_{ij}$ of matrix W may be expressed as follows:

$$w_{ij} = (1 - \varepsilon_i) \frac{c_{ij}}{n_j}, \quad (5)$$

where $c_{ij}$ is the number of times $g_i$ occurs in sentence $h_j$, $n_j$ is the total number of n-grams present in this sentence, and $\varepsilon_i$ is the normalized entropy of $g_i$, in V 203. The global weighting implied by $1-\varepsilon_i$, reflects the fact that two n-grams appearing with the same count in a particular sentence do not necessarily convey the same amount of information; this is subordinated to the distribution of the n-grams in the entire set V 203. That means, for example, that for a word like 'the', which occurs in almost every sentence, normalized entropy $\varepsilon_i$ would be very close to 1, which means that global weighting implied by $1-\varepsilon_i$ would be very close to zero, and therefore may be not informative. For a word that has normalized entropy $\varepsilon_i$ close to zero, global weighting implied by $1-\varepsilon_i$ would be close to one, meaning that this word may be informative.

FIG. 5A shows a diagram that illustrates a singular value decomposition ("SVD") of a matrix W, as shown in FIG. 4 to construct a vector space 205, as shown in FIG. 2 according to one embodiment of invention. A singular value decomposition ("SVD") of (M×N) matrix W reads as follows:

$$W = USV^T, \quad (6)$$

where U is the (M×R) left singular matrix 503 with row vectors $u_i$ ($1 \le i \le M$), S is the (R×R) diagonal matrix 505 of singular values $s_1 \ge s_2 \ge \ldots \ge s_R \ge 0$, V is the (N×R) right singular matrix 507 with row vectors $v_j$ ($1 \le j \le N$), wherein R<<M, N is the order of the decomposition, and $^T$ denotes matrix transposition. Both left and right singular matrices U 503 and V 507 are column-orthonormal, i.e., $U^T U = V^T V = I_R$ (the identity matrix of order R). Thus, the column vectors of matrices U and V each define an orthonormal basis for the space of dimension R spanned by the (R-dimensional) $u_i$'s and $v_j$'s. This space may be referred as a vector space, such as vector space 205 of FIG. 2. In one embodiment, vector space L 205 is a latent semantic space.

The basic idea behind (6) is that the rank-R decomposition captures the major structural associations in W and ignores higher order effects. Hence, the relative positions of the sentence vector representations (anchors) in the vector space reflect a parsimonious encoding of the semantic concepts used in the training data. This means that any input sequence of words; e.g., a sentence, mapped onto a vector space "close" (in some suitable metric) to a particular sentence anchor would be expected to be closely related to the corresponding training sentence, and any training sequence of words (e.g., sentence) whose representation ("anchor") is "close" to a vector representation of input sequence of words in the space L would tend to be related to this input sentence. This offers a basis for determining sentence neighborhoods.

Referring back to FIG. 9, method 900 continues with operation 903 that involves extracting global semantic information associated with the input sequence of words based on the analyzing. The global semantic information may be, for example, at least a surface meaning of the input sentence, such as a topic of the input sentence, and meanings of the words in the input sentence. In one embodiment, the global semantic information associated with the input sequence of words is used to identify which one or more words of the training sequences from the training corpus are globally relevant to the input sequence. Method 900 continues with operation 904 that involves identifying one or more words in the training sequences of words in the vector space that are associated with the global semantic information. In one embodiment, the identified training sequences of words are globally semantically relevant to the input sequence of words. Method 900 continues with operation 905 that involves assigning a part-of-speech tag to a word of the input sequence based on POS tags from the identified one or more words in the training sequences.

Figure 6:
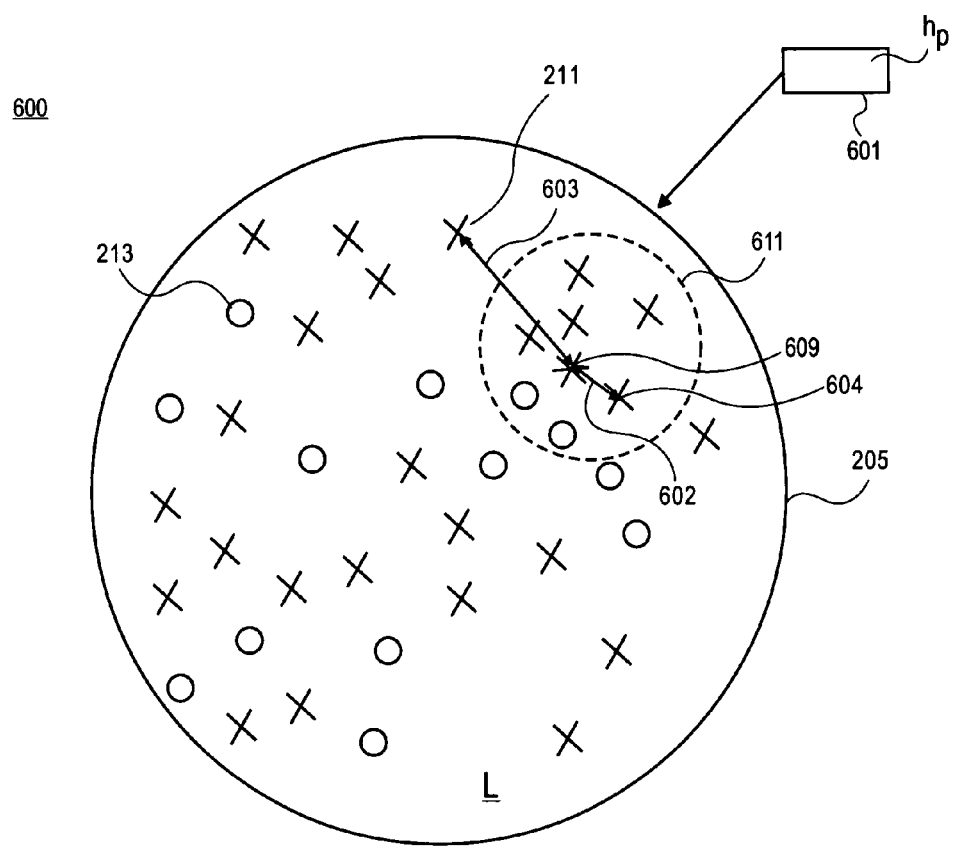
FIG. 6 shows a schematic that illustrates mapping of an input sequence of words into a vector space according to one embodiment of the invention.

FIG. 6 illustrates mapping of an input sequence of words into a vector space according to one embodiment of the invention. As shown in FIG. 6, vector space L 205 includes vector representations of training sequences of words hj, such as vector representation 211 illustrated by a cross, and vector representations of n-grams gi of the set V, such as a vector representation 213 illustrated by a circle. Two word sequences (e.g., sentences) whose representations are "close" in space 603 tend to convey the substantially the same semantic meaning. As shown in FIG. 6, an input sequence of words hp 601 is mapped into vector space 205. The mapping of the input sequence 601 into vector space 205 encodes the semantic information. That is, the position of the input sequence 609 in vector space 205 is driven by the meaning of the input sentence, and therefore may fall into a cluster (not shown) in the vector space 205 that defines the topic of the input sentence 609. As shown in FIG. 6, a neighborhood 611 associated with the input sequence 601 in the vector space 205 is formed. Neighborhood 611 represents one or more training sequences of words that are globally relevant, for example, have the substantially similar topic as the input sequence 601. As shown in FIG. 6, neighborhood 611 includes vector representations such as a vector representation 604, of training sequences that are globally relevant to the input sequence, as described in further detail below. That is, mapping of the input sequence 601 to the LS space 205 is performed to evaluate which training sequences from the training corpus are globally relevant to the input sentence 601.

FIG. 5B is a diagram similar to the diagram of FIG. 5A that illustrates mapping of an input sequence of words (e.g., a sentence) into a latent semantic mapping ("LSM") vector space according to one embodiment of the invention. An input sequence not seen in the training corpus, for example sentence hp (where p>N) may be mapped into a vector space 603 of FIG. 6 as follows. For each n-gram in training corpus τ 201, the weighted counts $w_{ip}$ with j=p are computed according to expression (5) for sentence hp. The resulting feature vector, a column vector of dimension M, can be thought of as an additional (N+1) column 512 of the matrix W 511.

In one embodiment, if the input sequence of words is globally relevant to training sequences of words, for example, the input sentence has substantially the same style, general topic, matrices U 513 and S 514 will be substantially similar to matrices U 503 and S 505. Therefore, assuming the matrices U and S do not change appreciably, so that matrix U 513 is substantially similar to matrix U 503, and matrix S 514 is substantially similar to matrix S 505, the SVD expansion (6) will read as follows:

$$\tilde{h}_p = US\tilde{v}_p^T \qquad (7)$$

where the R-dimensional vector $\tilde{v}_p^T$ acts as an additional (N+1) column 516 of the matrix $V^T$. This in turn leads to the definition:

$$\tilde{\bar{v}}_p = \tilde{v}_p S = \tilde{h}_p^T U \qquad (8)$$

Figure 10:
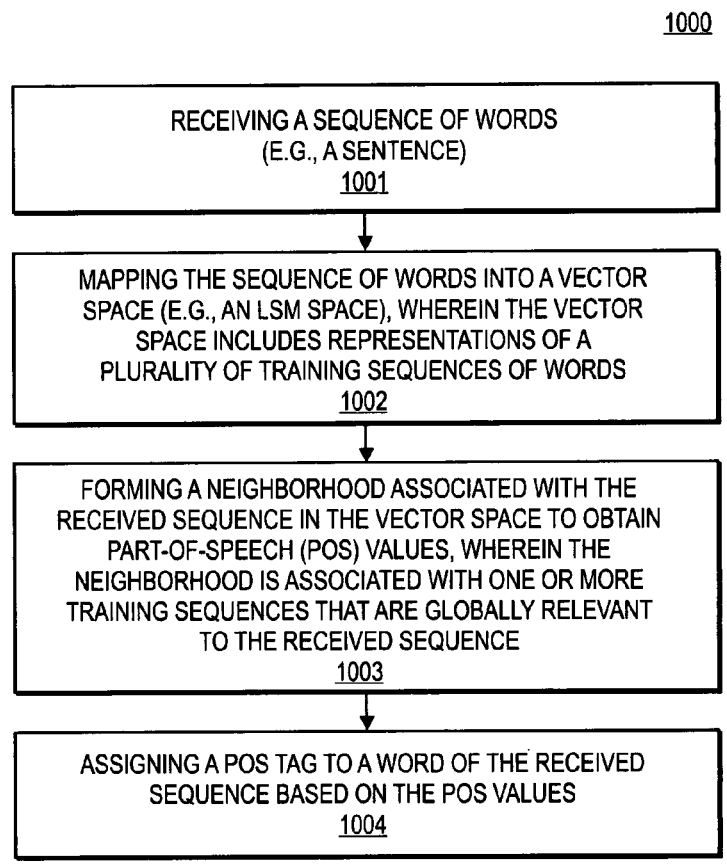
FIG. 10 shows a flowchart of one embodiment of a method to assign POS tags to words.

FIG. 10 shows a flowchart of one embodiment of a method to assign POS tags to words. Method 1000 begins with operation 1001 that involves receiving a sequence of words (e.g., a sentence), as described above. At operation 1002 the received sequence is mapped into a vector space, as described above. In one embodiment, the vector space is an LSM space. In one embodiment, the vector space includes representations of a plurality of training sequences of words from a training corpus, as described above. Next, method 1000 continues with operation 1003 that involves forming a neighborhood associated with the received sequence of words in the vector space to obtain POS characteristics, for example, POS values. In one embodiment, the neighborhood is associated with one or more training sequences that are globally relevant to the received sequence.

In one embodiment, one or more training sequences that are globally relevant to the received sequence of words are selected from the plurality of training sequences selected to form the neighborhood, and the training sequences that are not globally relevant to the received sequence of words are rejected. In one embodiment, a closeness measure, for example, a distance, between representations of a training sequence of the plurality of the training sequences and the input sequence in the vector space is determined to form the neighborhood. A training sequence may be selected out of the plurality of the training sequences based on the closeness measure, as described in further detail below. Next, at operation 1004, a POS tag is assigned to a word of the received sequence based on the POS characteristics (e.g., POS values) obtained from the neighborhood.

Referring back to FIG. 6, neighborhood 611 is formed based on a closeness measure between vector representations of the input sequence 609 and training sequence in vector space 205. In one embodiment, the closeness measure is associated with a distance between vector representations of the input sequence 609 and each of the training sequences 211 in vector space 205. As shown in FIG. 6, closeness measures 602 and 603 between vector representations of each of the training sequence and input sequence 609 in vector space 205 are determined. As shown in FIG. 6, training sequence 604 is selected for neighborhood 611, and training sequence 211 is not selected based on the closeness measure. The closeness measure determines global relevance of the each of the training sequences to the input sequence.

In one embodiment, each of the closeness measures 602 and 603 are compared to a predetermined threshold. The training sequence may be selected if the closeness measure 602 exceeds the predetermined threshold. The training sequence 211 may be rejected if closeness measure 603 is less or equal to the predetermined threshold. The predetermined threshold may be chosen depending on a particular application or task at hand. In another embodiment, to form neighborhood 611, the training sequences are ranked according to their closeness measures to the input sequence in vector space 205. The training sequence that has a rank equal or higher than a predetermined rank may be selected to form neighborhood 611, and the training sequence that has the rank lower than the predetermined rank may be rejected. The predetermined rank may be any number 2, 3, ... N and may be chosen according to a particular application or task at hand.

Referring back to expression (8), it remains to specify a suitable closeness measure to compare $\tilde{\bar{V}}_p$ to each of the $\bar{v}$'s. In one embodiment, the closeness measure is a Euclidian distance between vector representation $\tilde{\bar{V}}_p$ of the input sequence and each of the vector representations $\bar{v}_j$ of the training sequences. In another embodiment, the closeness measure is the cosine of the angle between them ("cosine distance"). For example, for each of the training sequences the closeness measure to the vector representation of the input sequence 609 may be calculated as follows:

$$K(\tilde{v}_p, \bar{v}_j) = \cos(v_p S, v_j S) = \frac{\tilde{v}_p S^2 v_j^T}{\|\tilde{v}_p S\| \|v_j S\|}, \qquad (9)$$

for any 1≤j≤N. Using (9), all training sentences can be ranked in decreasing order of closeness to the representation of the input sentence 609. The associated sentence neighborhood 609 may be formed by retaining only those training sequences whose closeness measure is higher than a predetermined threshold.

FIG. 7 shows an example of sentence neighborhood according to one embodiment of the invention. As shown in FIG. 7, a Table I (701) contains an actual sentence neighborhood for an example input sentence (2). As shown in Table I, a sentence neighborhood, such as neighborhood 611, includes training sentences that are globally relevant to an input sentence, such as input sentence "Jet streams blow in the troposphere". As shown in FIG. 7, training sentences are grouped according to reference words that are substantially the same as the words from the input sentence. Group 701 includes training sentences having word "jet" from input sequence (2), group 702 includes training sentences having word "streams" from input sequence (2), group 703 includes training sentences having word "blow" from input sequence (2), and group 704 includes training sentences having word "troposphere" from input sequence (2).

Figure 11:
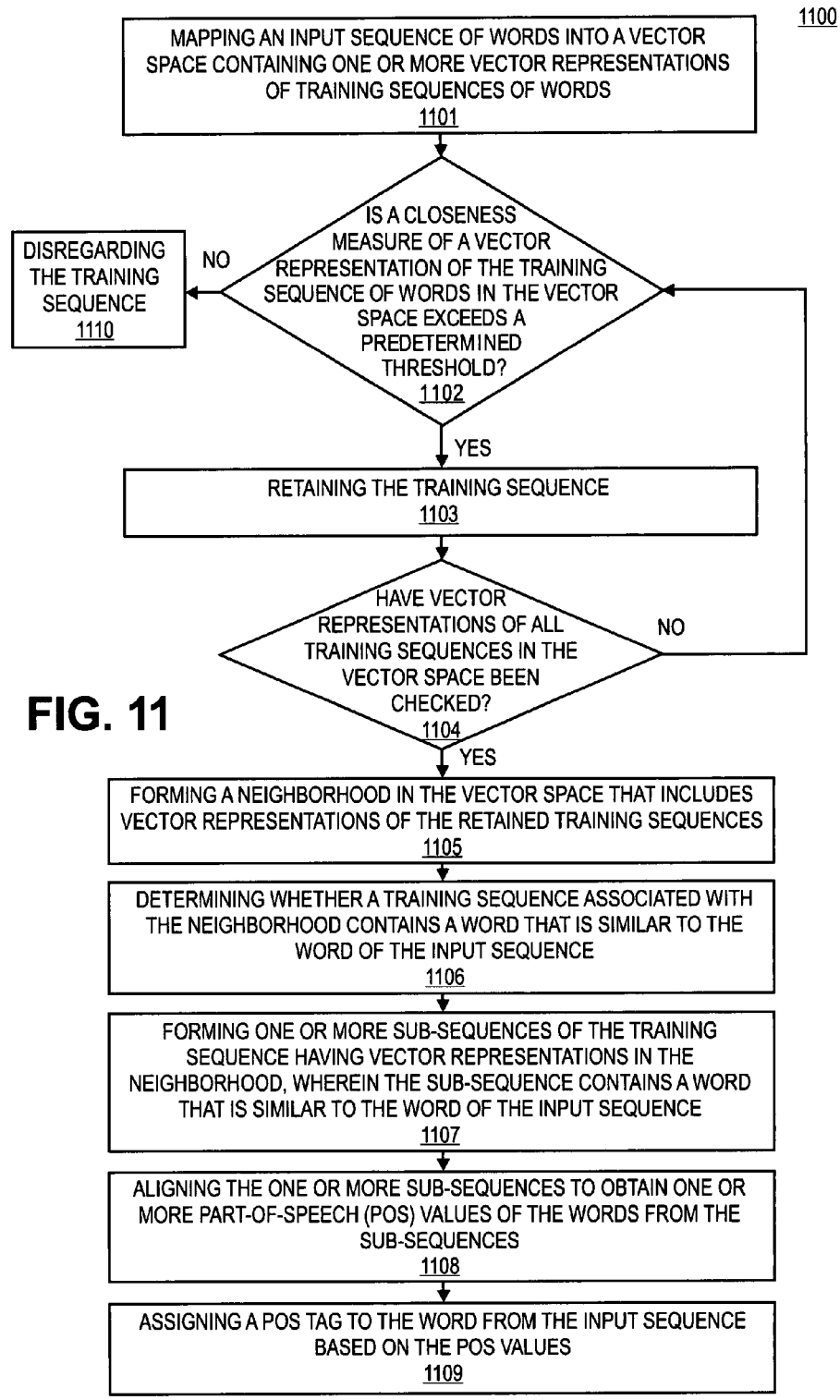
FIG. 11 shows a flowchart of one embodiment of a method to form a neighborhood to assign POS tags to words.

FIG. 11 shows a flowchart of one embodiment of a method to form a neighborhood to assign POS tags to words. Method starts with operation 1101 that involves mapping an input sequence of words into a vector space containing one or more vector representations of training sequences of words. Next, at operation 1102 a determination is made whether a closeness measure of a vector representation of the training sequence of words in the vector space exceeds a predetermined threshold. If the closeness measure of the vector representation of the training sequence of words in the vector space exceeds the predetermined threshold, the training sequence is retained at operation 11103. If the closeness measure of the vector representation of the training sequence of words in the vector space is less than the predetermined threshold, the training sequence is disregarded at operation 1110. That is, the training sequence of words that is globally not relevant to the input sequence of words is disregarded.

Next, a determination is made whether closeness measures of vector representations of all training sequences have been checked at operation 1104. If not all training sequences have been checked, the operation 1102 method 1100 returns to operation 1102. If closeness measures of vector representations of all training sequences have been checked, method 1100 continues with operation 1105 that involves forming a neighborhood in the vector space that includes representations of the retained training sequences. Next, at operation 1106, a determination is made whether a training sequence represented in the neighborhood contains a word that is substantially similar to (e.g., the same as) the word of the input sequence of words. Next, operation 1107 is performed that includes forming one or more sub-sequences of the training sequence having vector representation in the neighborhood. The sub-sequences contain the words that are substantially similar to the words of the input sequence. Next, one or more sub-sequences are aligned at operation 1108 to obtain one or more POS characteristics (e.g., values) of the words from the sub-sequences. Method 1100 continues with operation 1109 that involves determining a POS tag for the word from the input sequence based on the obtained POS characteristics (e.g., POS values).

Referring back to FIG. 6, as set forth above, neighborhood 611 represents labeled training sequences of words having POS tags. Therefore, associated POS sequences are readily available from the labeled training corpus. In principle, each of these POS sequences contains at least one sub-sequence which is germane to the input sentence. Thus, the final POS sequence can be assembled by judicious alignment of appropriate POS sub-sequences from the sentence neighborhood.

Figure 8:
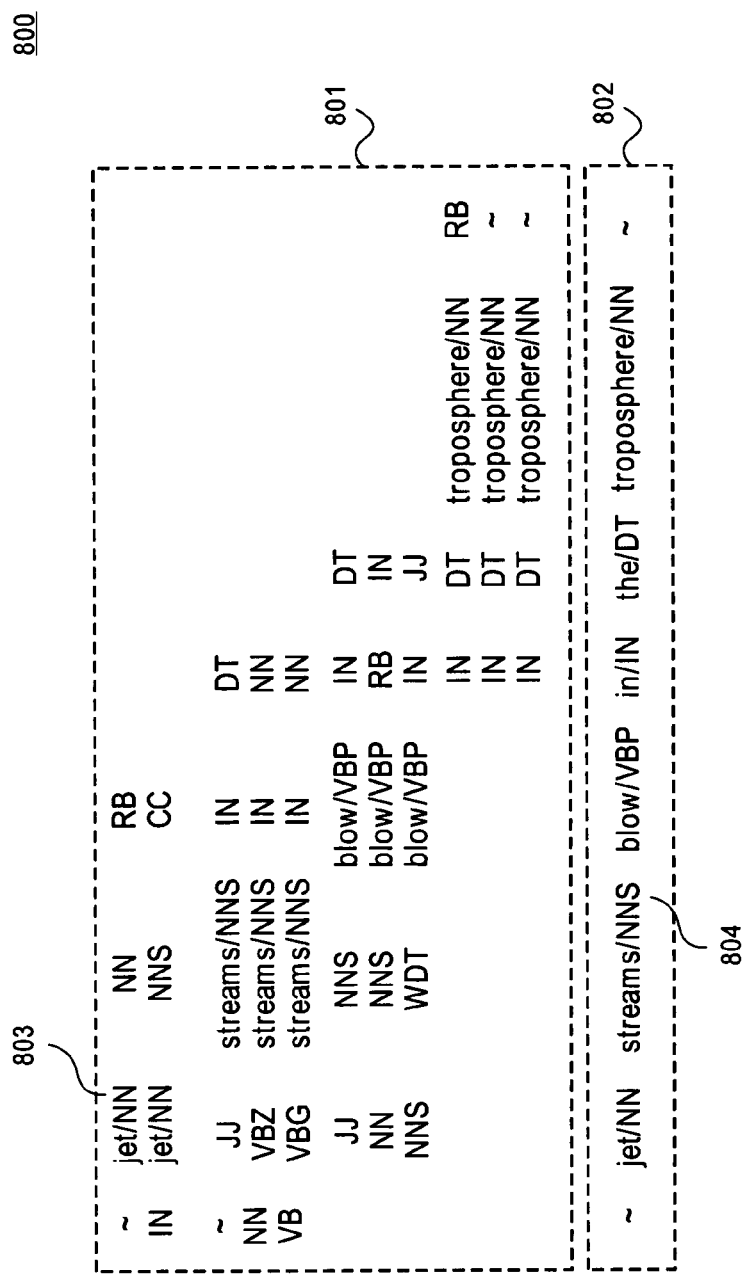
FIG. 8 shows an example of one embodiment of sequence alignment.

FIG. 8 illustrates an example of one embodiment of sequence alignment. Referring to example input sentence (2), and proceeding word by word, the POS sub-sequences from entries in the sentence neighborhood, for example, as shown in FIG. 7, are collected in table 801. As shown in table 801, the POS sub-sequences contain the relevant reference words, such as "jet", "streams", "blow", "in", and "troposphere" from the input sequence of words (2). It may be necessary to retain only (2K+1) POS in each sub-sequence, centered around that of the current input word. That is, around each word of the input sentence the sub-sentences may be selected out of globally relevant training sentences, which contain that word of the input sentence. K is referred as the size of the local scope. For example shown in FIG. 8, the local scope is set to K=2. Proceeding left-to-right along the input sentence, such as sentence (2), we thus obtain a set of POS characteristics, such as a POS value 803, for each word, where each POS value is substantially consistent with global semantic information extracted from the training corpus and germane to the input sentence, such as sentence (2). A POS tag for each of the words of the input sentence is determined based on POS characteristics of the words from the sub-sequences contained in the neighborhood, such as neighborhood 611. In one embodiment, a POS tag for each of the words of the input sentence is determined by computing the maximum likelihood estimate for every word of the input sentence using the obtained POS value counts from, for example, table 801. The resulting POS tags, such as POS tag 804, for each of the words from the input sequence are shown in table 802.

The final POS sequence may read as follows:

$$\text{Jet/NN streams/NNS blow/VBP in/IN the/DT troposphere/NN} \tag{10}$$

In one embodiment, when the number of one POS values and the number of another POS values that label the words from the sub-sequences are substantially equal, for example, when 50% of the POS values represent nouns and 50% of POS values represent verbs, then the statistics from the whole training corpus can be used to determine the proper POS tag for the input word. A comparison with (3) and (4) shows that POS tagging using latent analogy is able to satisfactorily resolve the inherent POS ambiguity discussed previously. This bodes well for its general deployability across a wide range of applications.

Figure 12:
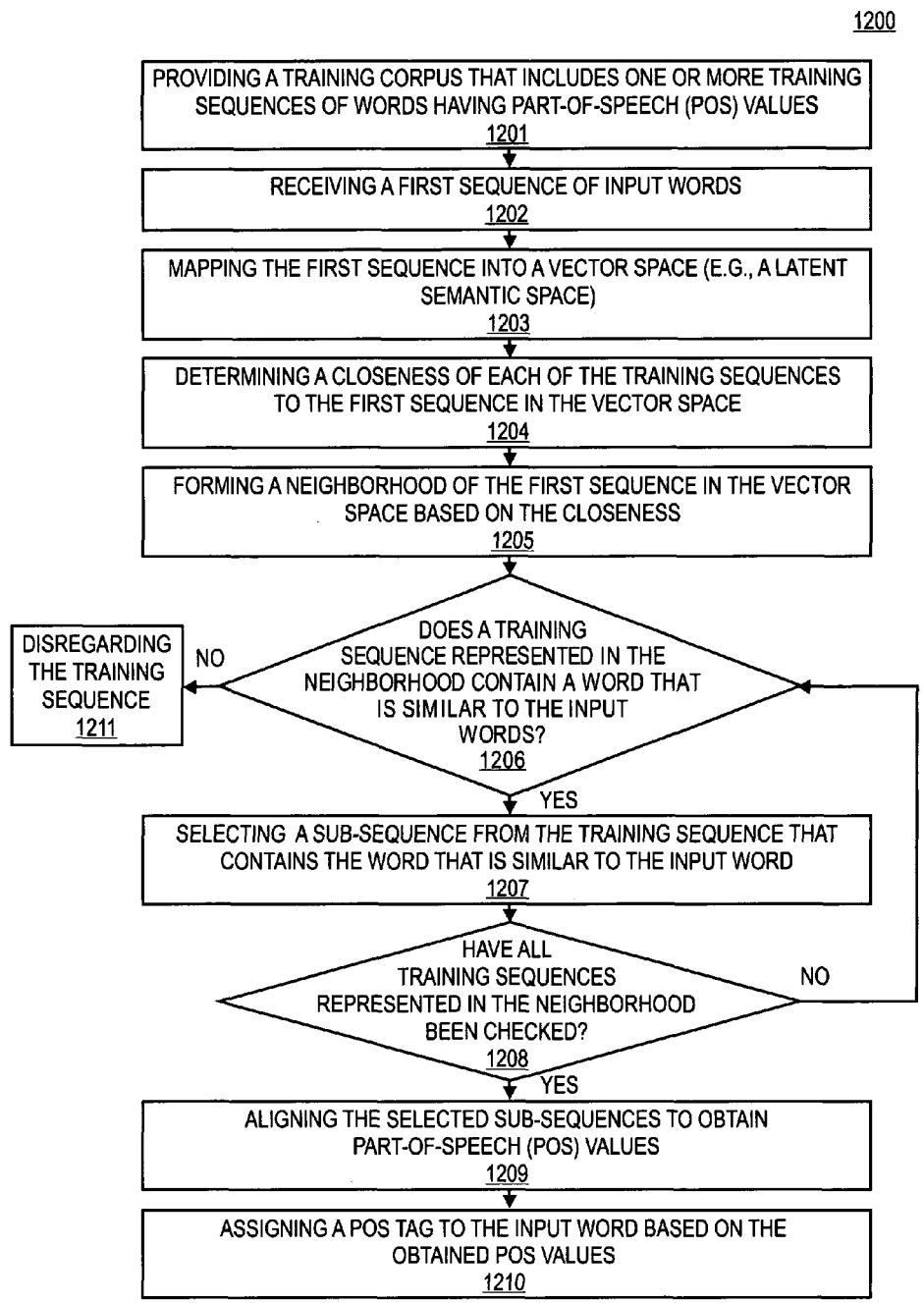
FIG. 12 shows a flowchart of one embodiment of a method to align sub-sequences to assign POS tags to words.

FIG. 12 shows a flowchart of one embodiment of a method 1200 to align sub-sequences to assign POS tags to words. At operation 1201 a training corpus that includes one or more training sequences of words having POS characteristics (e.g., POS values) is provided, as described above. Method 1200 continues with operation 1202 that involves receiving a sequence of input words, as described above. At operation 1203 the sequence of input words is mapped in a vector space, for example, a LS space, as described above. The closeness of each of the training sequences to the sequence of input words is determined at operation 1204, as described above. Next, operation 1205 that involves forming a neighborhood of the sequence of input words in the vector space is formed based on the closeness. The neighborhood represents one or more training sequences, as described above.

At operation 1206 determination is made whether the training sequence represented in the neighborhood contains a word that is substantially similar to the input word. If the training sequence does not contain the word that is substantially similar to the input word, the training sentence is disregarded at operation 1211. If the training sequence contains the word that is substantially similar to the input word, the training sentence is retained, and a sub-sequence of such training sequence is selected that contains the word that is substantially similar to the input word at operation 1207.

Next, at operation 1208 determination is made have all or a predetermined number of training sequences of words represented in the vector neighborhood been checked. If not all or predetermined number of training sequences represented in the neighborhood have been checked, method 1200 returns to operation 1206. If all or a predetermined number of training sequences represented in the neighborhood have been checked, method 1200 continues at operation 1209 that involves aligning the selected sub-sequences to obtain POS characteristics (e.g., POS values) of the words from the sub-sequences. Next, assigning a POS tag to the input word is performed based on the obtained one or more POS characteristics (e.g., POS values) of the word from the sub-sequences that is substantially similar to the input word.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing", "computing", "calculating", "determining" and the like, refer to the action and processes of a data processing system, or similar electronic computing device, that manipulates and transforms data represented as physical (electronic) quantities within the data processing system's registers and memories into other data similarly represented as physical quantities within the data processing system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A method, comprising:
   analyzing a corpus having first training sequences of words in a semantic vector space; extracting a global semantic information associated with an input sequence of words from the semantic vector space;
   selecting second training sequences of words having part-of-speech tags in the semantic vector space based on the global semantic information and the first training sequences; and
   assigning a part-of-speech tag to at least one word of the input sequence based on the part-of-speech tags of the second training sequences, wherein at least one of the analyzing, extracting, selecting, and assigning is performed by a processor.

2. The method of claim 1, wherein the semantic vector space includes a latent semantic space.

3. The method of claim 1, wherein the analyzing comprises
   mapping the input sequence into the semantic vector space; and
   forming a neighborhood associated with the input sequence in the semantic vector space, wherein the neighborhood represents one or more second training sequences that are globally semantically relevant to the input sequence.

4. The method of claim 1, wherein the analyzing comprises determining a closeness measure between the first training sequences and the input sequence in the semantic vector space.

5. The method of claim 1, wherein the global semantic information is used to identify the second training sequences that are globally semantically relevant to the input sequence.

6. A method to assign part-of-speech tags to words, comprising:
   receiving an input sequence of words;
   mapping the input sequence into a semantic vector space, wherein the semantic vector space includes representations of a first plurality of training sequences of words; and
   forming a neighborhood associated with the input sequence in the semantic vector space to obtain a part-of-speech tag for at least one word of the input sequence, wherein the neighborhood represents one or more second training sequences having part-of-speech tags selected from the first plurality of training sequences that are globally semantically relevant to the input sequence in the semantic vector space wherein at least one of the receiving, mapping, and forming is performed by a processor.

7. The method of claim 6, further comprising assigning a part-of-speech tag to the at least one word of the input sequence based on the part-of-speech characteristics.

8. The method of claim 6, wherein the semantic vector space includes a latent semantic space.

9. The method of claim 6, wherein the forming the neighborhood comprises
   determining a closeness measure between representations of a first training sequence of the first plurality of the training sequences and the input sequence in the semantic vector space; and
   selecting a second training sequence out of the first plurality of the training sequences based on the closeness measure.

10. The method of claim 9, further comprising
    determining whether the closeness measure exceeds a predetermined threshold, and selecting the training sequence if the closeness measure exceeds the predetermined threshold.

11. The method of claim 9, further comprising
    ranking the training sequences according to the closeness measure; and
    selecting the second training sequence that has rank higher than a predetermined rank.

12. The method of claim 6, further comprising
    determining whether a training sequence in the neighborhood contains a first word that is similar to an input word of the input sequence;
    forming one or more sub-sequences of the training sequence that contain one or more first words that are similar to the input words;
    aligning the one or more sub-sequences to obtain one or more part-of-speech characteristics of the first words; and
    determining a part-of-speech tag for the input word based on the one or more part-of speech characteristics of the first word.

13. An article of manufacture comprising:
    a non-transitory machine-accessible medium including data that, when accessed by a machine, cause the machine to perform operations comprising,
    analyzing a corpus having first training sequences of words in a semantic vector space;

extracting a global semantic information associated with an input sequence of words from the semantic vector space;

selecting second training sequences of words having part-of-speech tags in the semantic vector space based on the global semantic information and the first training sequences; and assigning a part-of-speech tag to to at least one word of the input sequence based on the part-of-speech tags of the second training sequences.

14. The article of manufacture of claim 13, wherein the semantic vector space includes a latent semantic space.

15. The article of manufacture of claim 13, wherein the analyzing comprises mapping the input sequence into the semantic vector space; and forming a neighborhood associated with the input sequence in the semantic vector space, wherein the neighborhood represents one or more second training sequences that are globally semantically relevant to the input sequence.

16. The article of manufacture of claim 13, wherein the analyzing comprises determining a closeness measure between the first training sequences and the input sequence in the semantic vector space.

17. The article of manufacture of claim 13, wherein the global semantic information is used to identify the second training sequences that are globally semantically relevant to the input sequence.

18. An article of manufacture comprising:

a non-transitory machine-accessible medium including data that, when accessed by a machine, cause the machine to perform operations to assign part-of-speech tags to words, comprising:

receiving an input sequence of words;

mapping the input sequence into a semantic vector space, wherein the semantic vector space includes representations of a first plurality of training sequences of words; and forming a neighborhood associated with the input sequence in the semantic vector space to obtain part-of-speech tag for at least one word of the input sequence, wherein the neighborhood represents one or more second training sequences having part-of-speech tags selected from the first plurality of training sequences that are globally semantically relevant to the input sequence in the semantic vector space.

19. The article of manufacture of claim 18, wherein the machine accessible medium further includes data that causes the machine to perform operations comprising, assigning a part-of-speech tag to the at least one word of the input sequence based on the part-of-speech characteristics.

20. The article of manufacture of claim 18, wherein the semantic vector space includes a latent semantic space.

21. The article of manufacture of claim 18, wherein the forming the neighborhood comprises determining a closeness measure between representations of a first training sequence of the first plurality of the training sequences and the input sequence in the semantic vector space; and selecting a second training sequence out of the first plurality of the training sequences based on the closeness measure.

22. The article of manufacture of claim 21, wherein the machine-accessible medium further includes data that causes the machine to perform operations comprising, determining whether the closeness measure exceeds a predetermined threshold, and selecting the training sequence if the closeness measure exceeds the predetermined threshold.

23. The article of manufacture of claim 21, wherein the machine-accessible medium further includes data that causes the machine to perform operations comprising, ranking the training sequences according to the closeness measure; and selecting the second training sequence that has rank higher than a predetermined rank.

24. The article of manufacture of claim 18, wherein the machine-accessible medium further includes data that causes the machine to perform operations comprising, determining whether a training sequence in the neighborhood contains a first word that is similar to an input word of the input sequence;

forming one or more sub-sequences of the training sequence that contain one or more first words that are similar to the input words;

aligning the one or more sub-sequences to obtain one or more part-of-speech characteristics of the first words; and determining a part-of-speech tag for the input word based on the one or more part-of-speech characteristics of the first word.

25. A data processing system, comprising:

means for analyzing a corpus having first having training sequences of words in a semantic vector space;

means for extracting a global semantic information associated with an input sequence of words from the semantic vector space;

means for identifying selecting second training sequences of words having part-of-speech tags in the semantic vector space based on the global semantic information and the first training sequences; and means for assigning a part-of-speech tag to a-at least one word of the input sequence based on the part-of-speech tags of the second training sequences.

26. A data processing system, comprising:

means for receiving an input sequence of words;

means for mapping the input sequence into a semantic vector space, wherein the semantic vector space includes representations of a first plurality of training sequences of words; and means for forming a neighborhood associated with the input sequence in the semantic vector space to obtain a part-of-speech tag for at least one word of the input sequence, wherein the neighborhood represents one or more second training sequences having part-of-speech tags selected from the first plurality of training sequences that are globally semantically relevant to the input sequence in the semantic vector space.

* * * * *